(12) United States Patent  
Yamamoto et al.

(10) Patent No.: US 12,414,536 B2
(45) Date of Patent: Sep. 16, 2025

(54) ANIMAL LITTER BOX

(71) Applicant: Unicharm Corporation, Ehime (JP)

(72) Inventors: Hiroki Yamamoto, Kanonji (JP); Yasuhiro Akino, Kanonji (JP)

(73) Assignee: Unicharm Corporation, Ehime (JP)

( * ) Notice: Subject to any disclaimer, the term of this patent is extended or adjusted under 35 U.S.C. 154(b) by 0 days.

(21) Appl. No.: 18/136,524

(22) Filed: Apr. 19, 2023

(65) Prior Publication Data

US 2023/0255175 A1    Aug. 17, 2023

Related U.S. Application Data

(63) Continuation of application No. PCT/JP2021/037727, filed on Oct. 12, 2021.

(30) Foreign Application Priority Data

Oct. 20, 2020    (JP) .................... 2020-176071

(51) Int. Cl.
*A01K 1/01* (2006.01)
*A01K 1/015* (2006.01)

(52) U.S. Cl.
CPC .......... *A01K 1/0107* (2013.01); *A01K 1/0152* (2013.01)

(58) Field of Classification Search
CPC .... A01K 1/0107; A01K 1/011; A01K 1/0114; A01K 1/0121; A01K 1/0125; A01K 1/0151; A01K 1/0152; A01K 1/015
See application file for complete search history.

(56) References Cited

U.S. PATENT DOCUMENTS

| | | | | |
|---|---|---|---|---|
| 4,362,128 A | * | 12/1982 | Downey | A01K 1/0151 119/528 |
| 2007/0068461 A1 | * | 3/2007 | Hill | A01K 1/0114 119/166 |
| 2008/0035069 A1 | * | 2/2008 | Yamamoto | A01K 1/0114 119/169 |

(Continued)

FOREIGN PATENT DOCUMENTS

| CN | 103648271 A | 3/2014 |
|---|---|---|
| CN | 107205360 A | 9/2017 |

(Continued)

OTHER PUBLICATIONS

Extended European Search Report issued in corresponding European Patent Application No. 21882659.2, dated Feb. 1, 2024 (7 pages).

(Continued)

*Primary Examiner* — Joshua D Huson
*Assistant Examiner* — Brook Victoria Schmid
(74) *Attorney, Agent, or Firm* — Osha Bergman Watanabe & Burton LLP

(57) ABSTRACT

An animal litter box includes a liquid passage portion having openings through which urine passes downward, and on which granules are disposed. The animal litter box includes an absorbent-body placement portion in which an absorbent body for absorbing the urine that has passed through the liquid passage portion is disposed. Each of the openings extends in a longitudinal direction. A maximum width of the openings in a width direction orthogonal to the longitudinal direction is equal to or smaller than 2.5 mm.

9 Claims, 23 Drawing Sheets

(56) References Cited

U.S. PATENT DOCUMENTS

| | | | | |
|---|---|---|---|---|
| 2013/0098300 A1* | 4/2013 | Matsuo | ............... | A01K 1/0107 |
| | | | | 119/166 |
| 2018/0220619 A1* | 8/2018 | Takagi | ............... | A01K 1/0114 |
| 2019/0373844 A1* | 12/2019 | Ward | .................. | A01K 1/0107 |
| 2022/0183251 A1* | 6/2022 | Yoshinaga | ........... | A01K 1/0114 |

FOREIGN PATENT DOCUMENTS

| | | | | | |
|---|---|---|---|---|---|
| CN | 207252470 | U | | 4/2018 | |
| CN | 111315209 | A | | 6/2020 | |
| EP | 1488691 | A2 | * | 12/2004 | ........... A01K 1/0107 |
| JP | 2007074996 | A | | 3/2007 | |
| JP | 2012175910 | A | | 9/2012 | |
| JP | 2016158565 | A | | 9/2016 | |
| JP | 2020022450 | A | | 2/2020 | |
| KR | 200431205 | Y1 | * | 11/2006 | |
| NL | 7905924 | A | * | 9/1980 | ........... A01K 1/0151 |
| TW | 201639450 | A | | 11/2016 | |
| WO | 2006025435 | A1 | | 3/2006 | |
| WO | 2011162347 | A1 | | 12/2011 | |
| WO | 2016140028 | A1 | | 9/2016 | |

OTHER PUBLICATIONS

International Preliminary Report on Patentability issued in corresponding International Application No. PCT/JP2021/037727, dated Apr. 13, 2023 (5 pages).
Office Action issued in corresponding Japanese Patent Application No. 2020-176071, dated Sep. 17, 2024 (7 pages).
Office Action issued in corresponding Japanese Patent Application No. 2020-176071, dated Nov. 26, 2024 (9 pages).
Office Action issued in counterpart Chinese Application No. 202180069120.5, mailed Sep. 25, 2024 (15 pages).
International Search Report issued in corresponding International Application No. PCT/JP2021/037727, dated Nov. 22, 2021 (7 pages).
Written Opinion issued in corresponding International Application No. PCT/JP2021/037727, dated Nov. 22, 2021 (8 pages).
Office Action issued in corresponding Chinese Patent Application No. 202180069120.5, dated May 30, 2025, with translation (12 pages).
Search Report issued in corresponding Chinese Patent Application No. 202180069120.5, dated May 30, 2025 (2 pages).

* cited by examiner

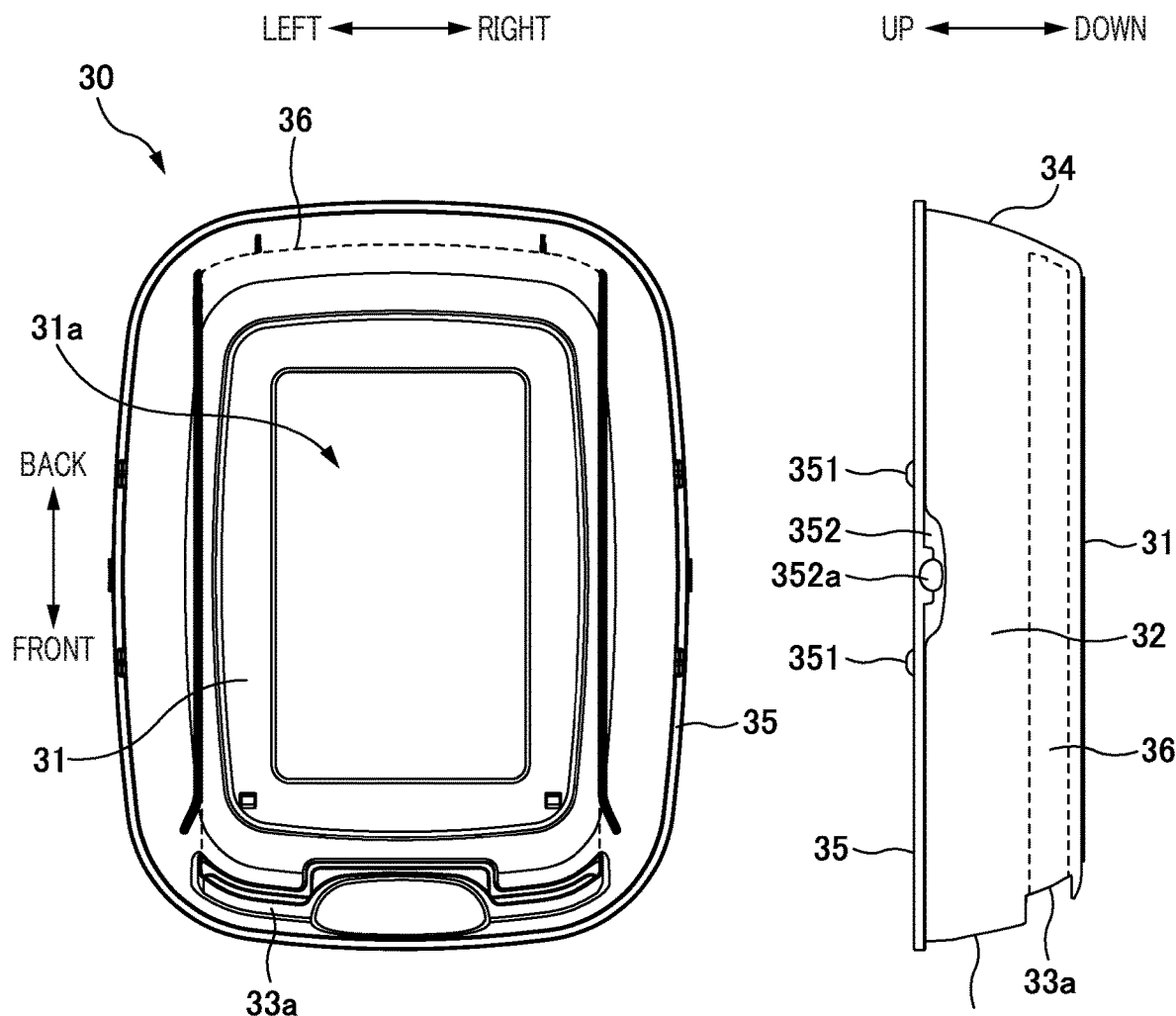
FIG. 5A
FIG. 5B
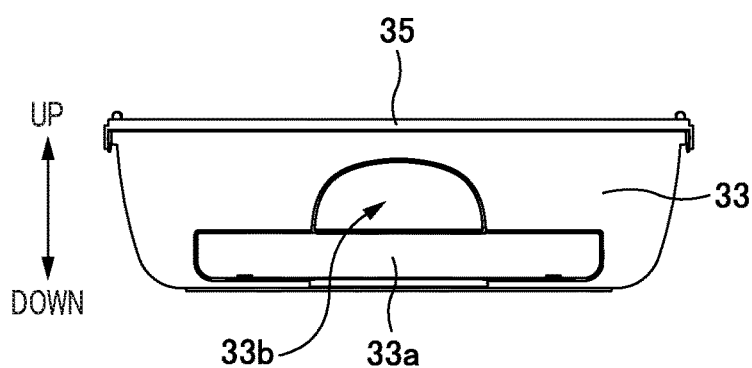
FIG. 5C

| NUMBER OF TIMES OF CLOGGING | n | m | m+n | m−n |
|---|---|---|---|---|
| 1 | 2.48 | 3.82 | 6.30 | 1.34 |
| 1 | 2.66 | 3.55 | 6.21 | 0.89 |
| 1 | 2.42 | 3.48 | 5.90 | 1.06 |
| 1 | 2.04 | 3.27 | 5.31 | 1.23 |
| 1 | 2.19 | 3.45 | 5.64 | 1.26 |
| 3 | 1.52 | 3.11 | 4.63 | 1.59 |
| 5 | 2.21 | 2.86 | 5.07 | 0.65 |
| 5 | 2.12 | 2.62 | 4.74 | 0.50 |
| 5 | 2.04 | 3.00 | 5.04 | 0.96 |
| 5 | 1.84 | 3.38 | 5.22 | 1.54 |
| 5 | 1.76 | 3.50 | 5.26 | 1.74 |

Rows with number of clogging 5 (and 3) bracketed as PARTICULARLY-LIKELY-TO-CLOG PARTICLES.

| (AVERAGE) | n | m | m+n | m−n |
|---|---|---|---|---|
| CLOGGED PARTICLES | 2.11 | 3.27 | 5.38 | 1.16 |
| PARTICULARLY-LIKELY-TO-CLOG PARTICLES | 1.98 | 3.06 | 5.04 | 1.08 |

FIG. 9

ANIMAL LITTER BOX

BACKGROUND

Field

The present invention relates to an animal litter box.

Description of the Related Art

Animal litter boxes for use by animals who are kept indoors such as cats are conventionally known. For example, Patent Literature 1 discloses an animal litter box including: a liquid passage portion (urine passage portion) having a plurality of openings (slits) through which urine excreted by an animal passes; and an absorbent-body placement portion for arranging an absorbent body which absorbs urine that has passed through the liquid passage portion. Further, when such an animal litter box is used, granules such as stone sand (e.g., cat litter) are placed on the liquid passage portion. Therefore, the openings of the liquid passage portion are formed having a size that allows passage of urine but prevents passage of granules.

PATENT LITERATURE

Patent Literature 1: Japanese Patent Application Publication No. 2016-158565

However, there is a risk that the granules (e.g., stone sand) are chipped and the chipped granules are caught (clogged) in the openings. When the granules are caught in the openings, the granules cannot be easily removed, it is no longer hygiene, and labour for preparing a special tool is needed.

SUMMARY

One or more embodiments provide an animal litter box which is capable of making granules less likely to be caught.

According to one or more embodiments, an animal litter box having a vertical direction includes: a liquid passage portion having a plurality of openings through which urine pass downward; and an absorbent-body placement portion in which an absorbent body for absorbing the urine that has passed through the liquid passage portion is placed, a plurality of granules being placed on the liquid passage portion, each of the openings having a longitudinal direction, and a width direction that is orthogonal to the longitudinal direction, a maximum width of the openings in the width direction is equal to or smaller than 2.5 mm.

Features of one or more embodiments other than the above will become clear by reading the description of the present specification with reference to the accompanying drawings.

According to one or more embodiments, it is possible to provide an animal litter box which is capable of making granules less likely to be caught.

BRIEF DESCRIPTION OF THE DRAWINGS

FIG. 5A is a top view of a lower container according to one or more embodiments.

FIG. 5B is a right side view of the lower container according to one or more embodiments.

FIG. 5C is a front view of the lower container according to one or more embodiments.

FIG. 9 is a diagram illustrating the relationship between the shape of the granule and the number of times of clogging.

DESCRIPTION OF THE EMBODIMENTS

Figure 1:
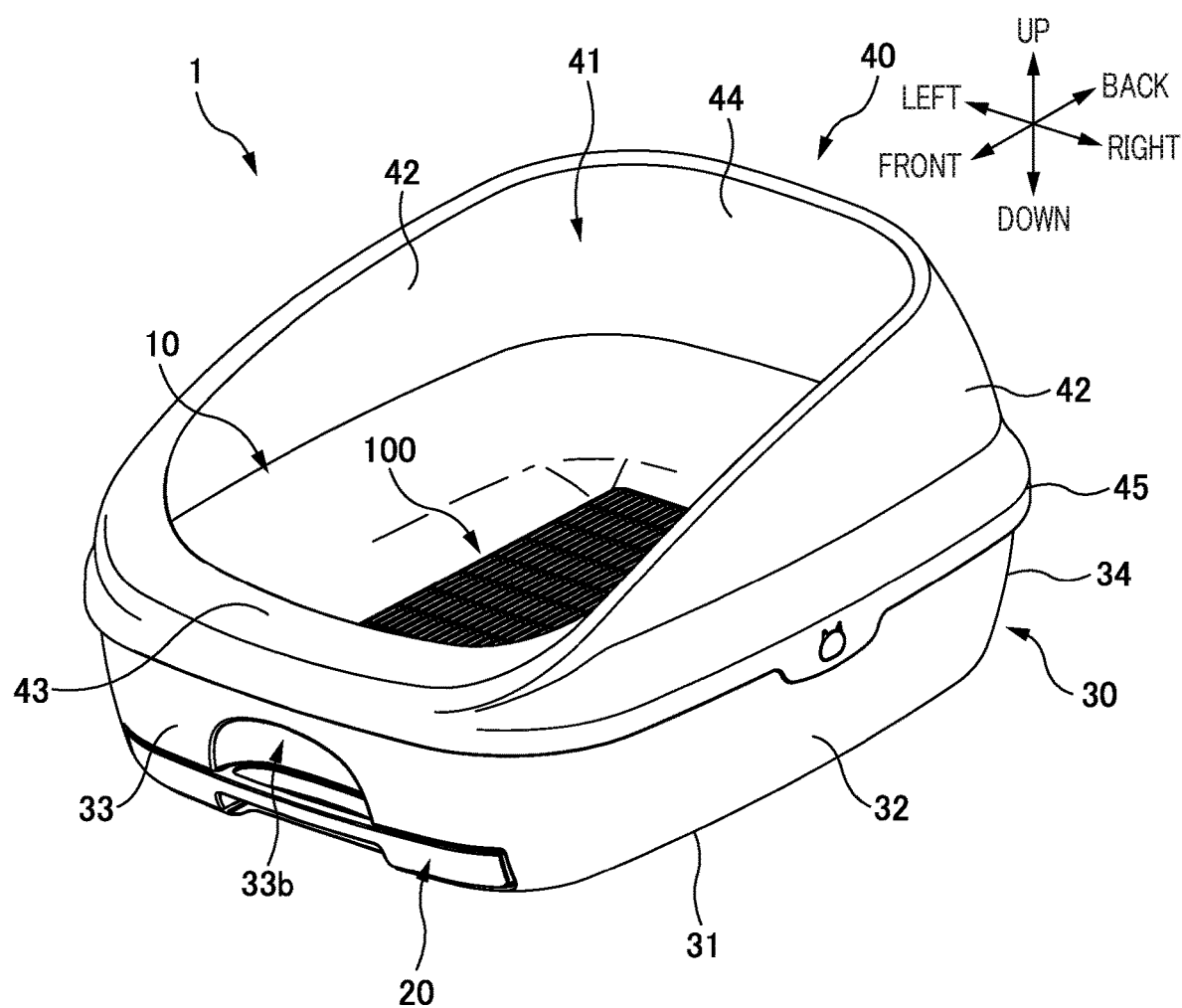
FIG. 1 is a schematic perspective view of an animal litter box according to one or more embodiments.

At least following matters will become clear with description of this specification and attached drawings.

An animal litter box having a vertical direction including: a liquid passage portion having a plurality of openings through which urine pass downward; and an absorbent-body placement portion in which an absorbent body for absorbing the urine that has passed through the liquid passage portion is placed, a plurality of granules being placed on the liquid passage portion, each of the openings having a longitudinal direction, and a width direction that is orthogonal to the longitudinal direction, a maximum width of the openings in the width direction is equal to or smaller than 2.5 mm.

According to the above-described animal litter box, by setting the width of the openings of the liquid passage portion to be equal to or smaller than 2.5 mm, the number of granules (stone sand) caught in the openings is less than half of the case of the conventional width (2.7 mm) (see the particle clogging test described later). Therefore, the granules can be made less likely to be caught in the openings.

In such an animal litter box, it is desirable that the maximum width of the openings is equal to or smaller than 2.3 mm.

According to the above-described animal litter box, the granules can be made further less likely to be caught.

In such an animal litter box, it is desirable that a liquid permeability in a state where the plurality of granules are placed on the liquid passage portion is equal to or greater than 90%.

According to the above-described animal litter box, it is possible to reduce the amount of urine remaining in the liquid passage portion, making an offensive odor less likely to generate.

In such an animal litter box, it is desirable that the maximum width of the openings is equal to or larger than 1.7 mm.

According to the above-described animal litter box, while maintaining the liquid permeability, the granules can be made less likely to be caught.

In such an animal litter box, it is desirable that the liquid passage portion has a plurality of first ribs extending in the longitudinal direction and arranged side-by-side in the width direction, that each of the openings is formed between the first ribs that are adjacent to each other in the width direction, and that the maximum width of the openings is larger than a maximum dimension of the first ribs in the width direction.

According to the above-described animal litter box, the granules can be made less likely to be caught.

In such an animal litter box, it is desirable that the liquid passage portion has a plurality of first ribs extending along the longitudinal direction and arranged side-by-side in the width direction, and that a maximum dimension of the first ribs in the width direction is equal to or smaller than 2.2 mm.

According to the above-described animal litter box, when the granule is caught in the opening, the granule can be removed by moving it upward from the first rib.

In such an animal litter box, it is desirable that at a predetermined position in the vertical direction between an uppermost part of the first rib and a lowermost part of the first rib, a dimension of the first ribs in the width direction is the maximum dimension, and that the uppermost part of the first rib and a widthwise end portion of the first rib that is located at the predetermined position are connected by a curved surface.

According to the above-described animal litter box, when the granule is caught in the opening, the granule can be moved along the curved surface of the first rib. Thus, the granule is easily removed.

In such an animal litter box, it is desirable that a difference between a position of the uppermost part of the first rib and the predetermined position in the vertical direction is equal to or smaller than 1.1 mm.

According to the above-described animal litter box, when the granule is caught in the opening, the granule is easily removed.

In such an animal litter box, it is desirable that a widthwise central space between the first ribs that are adjacent to each other in the width direction is equal to or smaller than 4.7 mm.

According to the above-described animal litter box, when the granule is caught in the opening, the granule can be removed by moving it upward from the first rib.

In such an animal litter box, it is desirable that the plurality of first ribs include a rib having a first vertical length, and a rib having a second vertical length that is different from the first vertical length.

According to the above-described animal litter box, the first ribs include ribs having different lengths (heights), and therefore even in the case where the granule is caught in the opening, the caught granule can be easily removed.

In such an animal litter box, it is desirable that the liquid passage portion has a plurality of second ribs extending in the width direction and arranged side-by-side in the longitudinal direction, that an outer periphery of each of the openings is surrounded by the first rib and the second rib, and that in at least either of the first ribs and the second ribs, a lower end has a curved portion that is curved upward.

According to the above-described animal litter box, urine is make likely to flow downward along the curved portion, improving the drainage of urine is.

Example

The animal litter box according to one or more embodiments is used by animals who are kept indoors such as cats, for example. The "animals" in the present specification include not only commonly known pets such as cats, dogs, rabbits, hamsters, and the like but also young offspring of a tigers or lions and the like.

Overall Configuration

Figure 2:
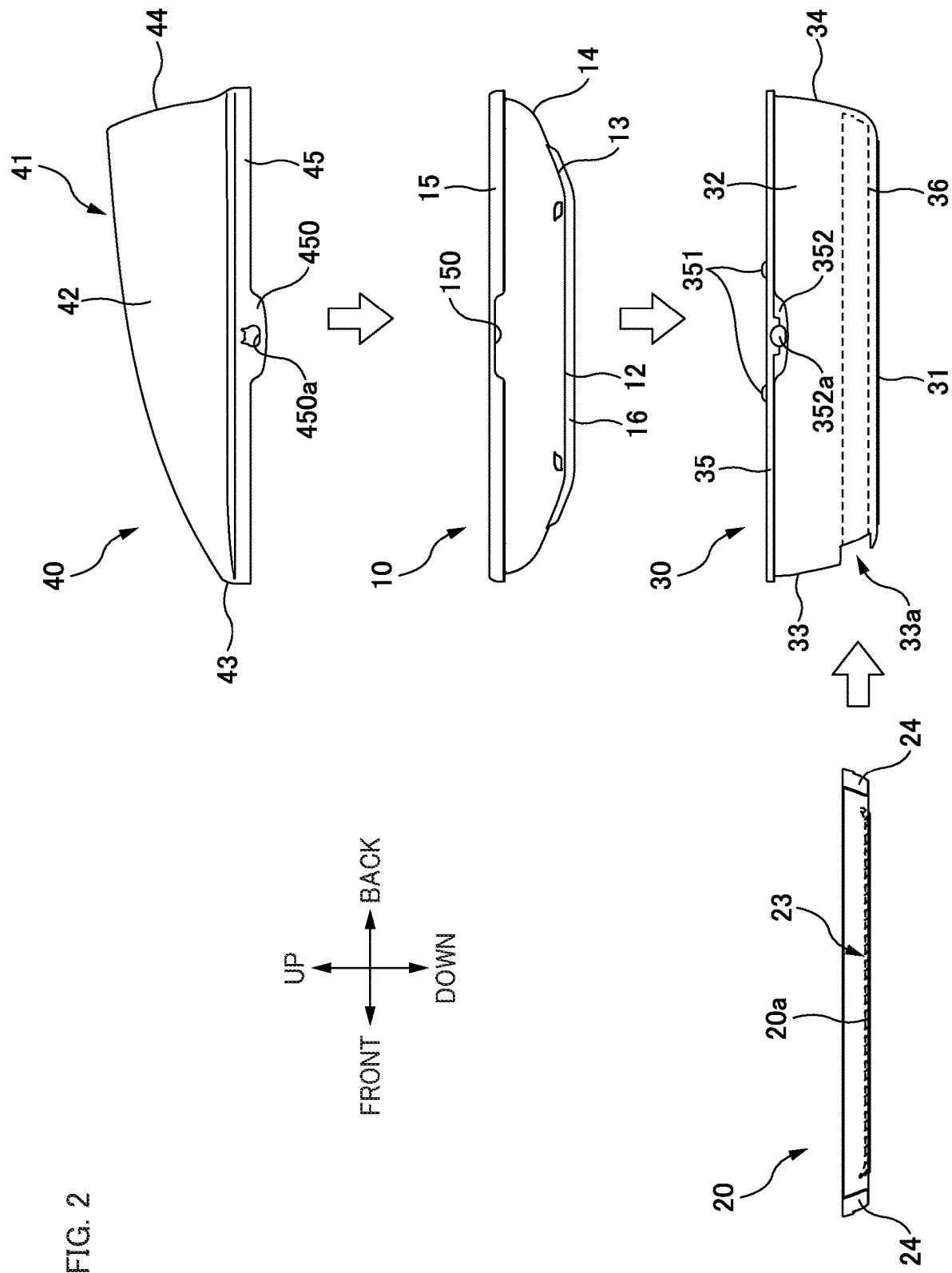
FIG. 2 is an exploded side view of the animal litter box according to one or more embodiments.

FIG. 1 is a schematic perspective view of an animal litter box 1 according to one or more embodiments. FIG. 2 is an exploded side view of the animal litter box 1. In addition, in the description below, three directions that are orthogonal to (intersect) one another, namely a "front-back direction", a "lateral direction", and a "vertical direction" are defined as shown in FIG. 1. The front-back direction is a direction extending along the longitudinal direction of the animal litter box 1, the side from which a tray 20 is pulled out from a lower container 30 is defined as the "front" side, and the opposite side is defined as the "back" side. The lateral direction is a direction extending along the width direction of the animal litter box 1, the right side when the animal litter box 1 is viewed from the front side is defined as "right", and the opposite side (left side) is defined as "left". The vertical direction is a direction extending along the up-down direction, the upper side in the up-down direction is defined as "up", and the lower side in the up-down direction is defined as "down".

The animal litter box 1 includes an upper container 10, the lower container 30, the tray 20 which is accommodated in the lower container 30, and a cover 40. It should be noted that each of the upper container 10, the tray 20, the lower container 30, and the cover 40 is formed of polyolefin-based thermoplastic resin, such as polyethylene (PE), polypropylene (PP), polyethylene terephthalate (PET), or the like. However, the material for constituting the members is not limited thereto. For example, other resins, metal plates such as stainless steel plates, aluminum plates and the like may be used.

As shown in FIG. 2, the upper container 10, the tray 20, the lower container 30, and the cover 40 can be freely attached to and detached from each other. Specifically, the lower container 30 is placed being stacked below and attached to the upper container 10. The lower container 30 detachably accommodates the tray 20 in which an absorbent body 20a that absorbs excreted urine and the like can be placed. The cover 40 is attached to the upper portion of the upper container 10. Since the members can be detached from each other in this manner, this makes it easier to clean.

Configuration of Upper Container 10

Figures 3A, 3B:
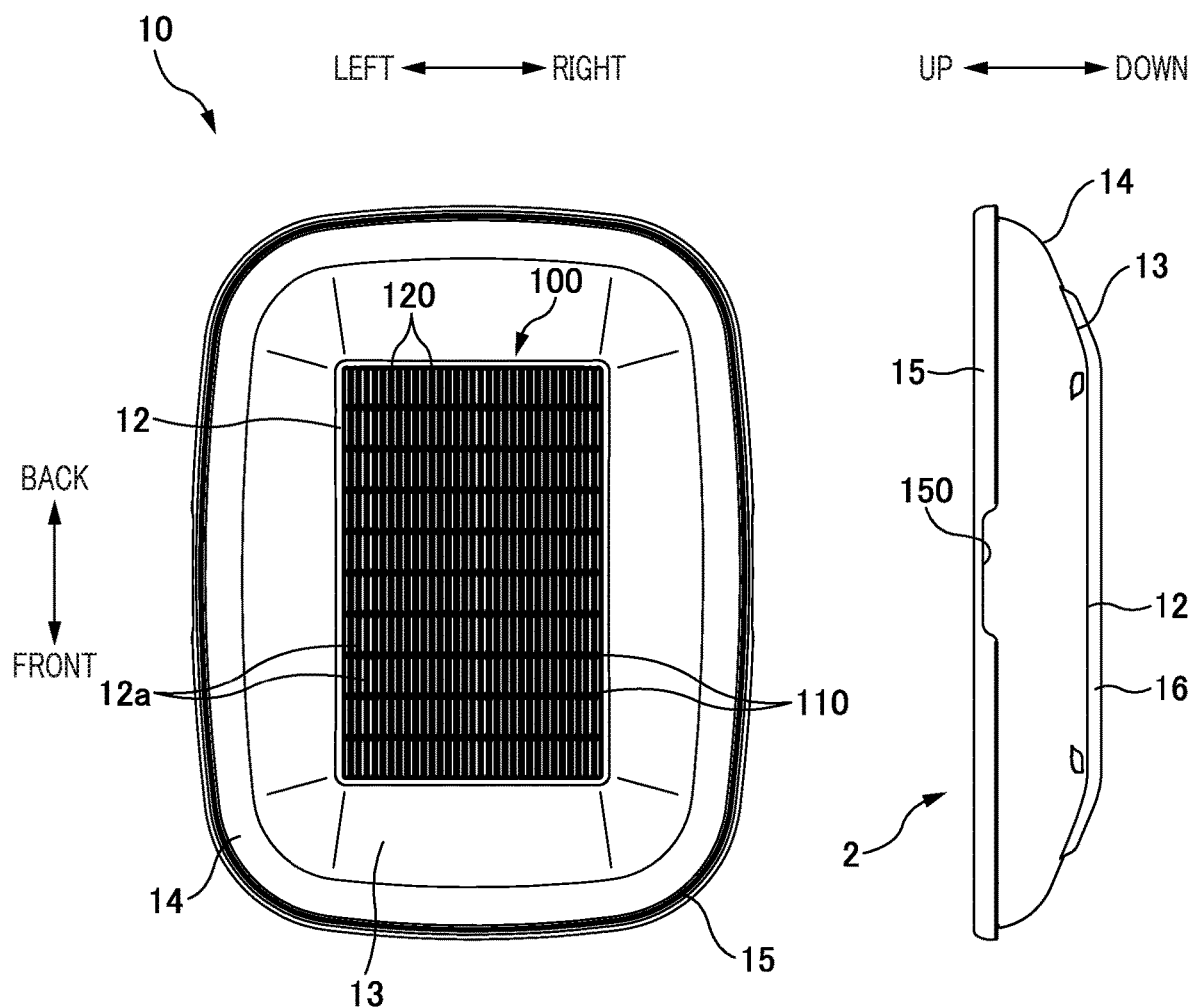
FIG. 3A is a top view of an upper container according to one or more embodiments.
FIG. 3B is a right side view of the upper container according to one or more embodiments.
Figure 3C:
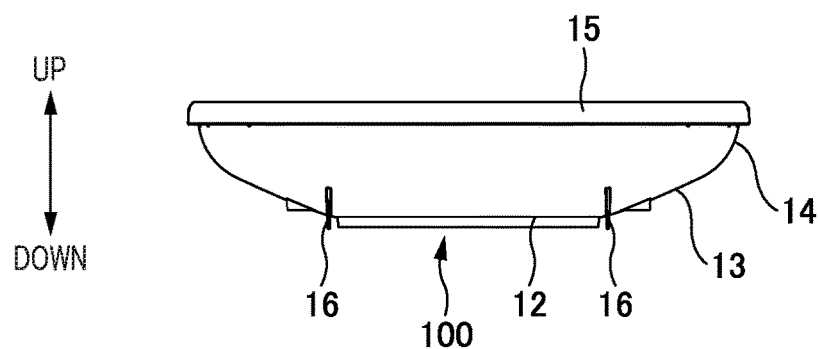
FIG. 3C is a front view of the upper container according to one or more embodiments.

FIG. 3A is a top view of the upper container 10. FIG. 3B is a right side view of the upper container 10. FIG. 3C is a front view of the upper container 10. The upper container 10 is a substantially box-shaped member having an open upper side, and an animal such as a cat performs excretion on the upper surface of the upper container 10. The upper container 10 of one or more embodiments has a bottom portion 12, an outer peripheral portion 13, a side portion 14, and a folded-back portion 15.

The bottom portion 12 is a portion that constitutes the bottom surface of the upper container 10, and is positioned at the lowest position in the upper container 10 in the vertical direction. On the bottom portion 12, there is provided a urine passage portion 100 (corresponding to a liquid passage portion) that allows urine or the like excreted by an animal to pass from above to below in the vertical direction. The urine passage portion 100 has a plurality of holes 12a (corresponding to openings) that penetrate in the vertical direction and allow urine to pass through downward, and the excreted urine passes through the holes 12a and moves from above to below in the upper container 10.

As shown in FIG. 3A, the urine passage portion 100 has a plurality of cross ribs 110 (corresponding to the second ribs) extending along the lateral direction and arranged side-by-side in the front-back direction. Further, the urine passage portion 100 has a plurality of longitudinal ribs 120 (corresponding to the first ribs) extending along the front-back direction and arranged side-by-side in the lateral direction. The urine passage portion 100 is formed in a grid shape by the plurality of cross ribs 110 and the plurality of longitudinal ribs 120. The holes 12a are formed by its outer periphery being surrounded by the cross ribs 110 and the longitudinal ribs 120. It should be noted that the specific configuration example of the urine passage portion 100 (the cross ribs 110, the longitudinal ribs 120, and the holes 12a) will be described later.

The outer peripheral portion 13 is provided continuing from the bottom portion 12, and in one or more embodiments, the outer peripheral portion 13 is provided continuing so as to be inclined upward from the peripheral edge of the urine passage portion 100. As shown in FIGS. 3B and 3C, on the back side of the outer peripheral portion 13, a plate member 16 extending along the longitudinal rib 120 is provided on each of two lateral sides of the plurality of longitudinal ribs 120 (urine passage portion 100). As shown in FIG. 3C, the pair of plate members 16 protrude downward and has a function as legs when the upper container 10 is placed on the floor, for example.

The side portion 14 is a surface that stands upward from the peripheral edge of the outer peripheral portion 13 and has a larger inclination than the outer peripheral portion 13.

The folded-back portion 15 is a portion formed by folding back the upper end of the side portion 14 downward. As shown in FIGS. 2 and 3B, notches 150 are formed at positions of the folded-back portion 15 facing each other in the lateral direction. The notches 150 is portions which an owner and the like can put on with their fingers for attaching the upper container 10 to the lower container 30 or for detaching the upper container 10 from the lower container 30. It should be noted that only one notch 150 of the two notches 150 is shown in FIGS. 2 and 3B.

Configuration of Tray 20

Figure 4:
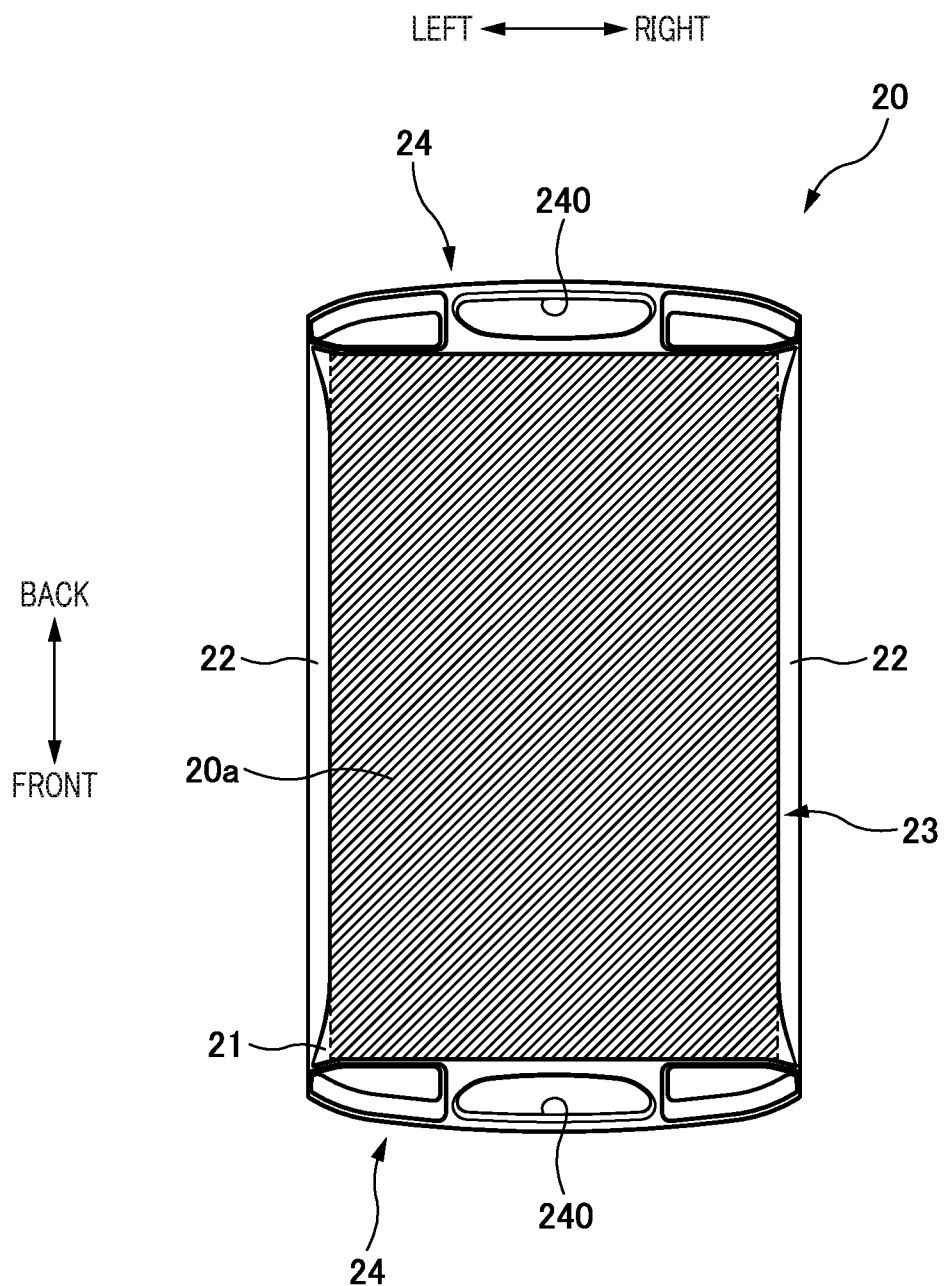
FIG. 4 is a plan view of the tray according to one or more embodiments.

FIG. 4 is a plan view of the tray 20. The tray 20 is a flat and box-shaped container with a shallow bottom in which the absorbent body 20a absorbing urine that has passed through the urine passage portion 100 of the upper container 10 is placed. The tray 20 has a bottom portion 21, side portions 22, an absorbent-body placement portion 23, and handle portions 24.

The bottom portion 21 is a portion that forms the bottom surface of the tray 20, and as shown in FIG. 4, the planar shape thereof is rectangular.

The side portions 22 each are a wall-shaped portion formed in the end portion of the bottom portion 21 so as to surround the outer periphery of the tray 20.

The absorbent-body placement portion 23 is a region in which the absorbent body 20a that absorbs urine or the like is placed on the bottom portion 21. The absorbent-body placement portion 23 is formed by being surrounded by the side portions 22. FIG. 4 shows a state where the absorbent body 20a (shown by the hatched portion in the drawing) is placed in the absorbent-body placement portion 23. The absorbent body 20a is a liquid-absorbent sheet member that absorbs urine excreted by an animal such as a cat, and is formed of a liquid-absorbent material such as pulp fibers or superabsorbent polymer. Further, deodorant microcapsules and an antimicrobial agent may be provided in the absorbent body 20a in order to trap the odor of absorbed urine and prevent the propagation of various bacteria. It should be noted that in FIG. 4, the absorbent body 20a is shown as a rectangular sheet member, but the shape of the absorbent body 20a is not limited as long as it can be held in the absorbent-body placement portion 23.

The handle portions 24 are portions formed in two front-back end portions of the tray 20. When inserting the tray 20 into the lower container 30 or pulling out the tray 20 from the lower container 30, the handle portion 24 is held and moved so that the tray 20 can slidingly move in the front-back direction. It should be noted that the tray 20 of one or more embodiments has a symmetrical shape in the front-back direction, and this makes it possible to accommodate it in the lower container 30 with the front-back direction of the tray 20 reversed. The handle portion 24 is formed with a hooking hole 240 for hooking a hand when putting in or taking out (attaching and detaching) the tray 20 to or from an accommodation space 36 of the lower container 30.

Configuration of Lower Container 30

FIG. 5A is a top view of the lower container 30. FIG. 5B is a right side view of the lower container 30. FIG. 5C is a front view of the lower container 30.

The lower container 30 is a substantially box-shaped member having an open upper portion, and is placed being stacked below and attached to the upper container 10 as shown in FIGS. 1 and 2 while the animal litter box 1 is in use.

Then, the lower container 30 supports the upper container 10 from below.

The lower container 30 includes a bottom portion 31, side wall portions 32, a front wall portion 33, a back wall portion 34, a folded-back portion 35, and an accommodation space 36.

The bottom portion 31 is a portion that constitutes the bottom surface of the lower container 30. In the bottom portion 31 of one or more embodiments, as shown in FIG. 5A, a bottom opening 31a that penetrates in the vertical direction is provided.

The side wall portions 32 are portions that constitute the lateral side surfaces of the lower container 30, and are wall-shaped portions that stand upward from two lateral ends of the bottom portion 31.

The front wall portion 33 is a portion that constitutes the front surface of the lower container 30 and is a wall-shaped portion that stands from the front end of the bottom portion 31. In the front wall portion 33, there is provided an attach/detach opening 33a for inserting or taking out (attaching and detaching) the tray 20 to or from the accommodation space 36. Further, as shown in FIGS. 1 and 5C, in the front wall portion 33, there is formed a recessed portion 33b that, at the time of holding the tray 20 with a hand, prevents the hand (fingers) from coming into contact with the front wall portion 33.

The back wall portion 34 is a portion that constitutes the back surface of the lower container 30 and is a wall-shaped portion that stands from the back end of the bottom portion 31.

The folded-back portion 35 is a portion formed by folding back downward the upper ends of the side wall portions 32, the front wall portion 33, and the back wall portion 34. At positions of the folded-back portion 35 opposite to each other in the lateral direction, fitting pieces 352 each having a protruding portion 352a are formed overhanging downward. It should be noted that, in FIGS. 2 and 5B, only one fitting piece 352 of the two fitting pieces 352 is shown. Further, on the upper end of the folded-back portion 35, two protrusions 351 that protrude upward are provided at positions opposite to each other in the lateral direction. The protrusions 351 are placed in a space formed by the folded-back portion 15 of the upper container 10 when the upper container 10 is attached to the lower container 30. Accordingly, the lateral movement of the upper container 10 with respect to the lower container 30 is restrained.

The accommodation space 36 is a space for accommodating the tray 20 in the lower container 30. It should be noted that in FIGS. 2 and 5B, the accommodation space 36 is shown by a dashed line.

Configuration of Cover 40

As shown in FIGS. 1 and 2, the cover 40 includes a cover opening 41, side wall portions 42, a front wall portion 43, a back wall portion 44, and an overhanging portion 45.

The cover opening 41 is a portion that serves as an entrance for an animal to the animal litter box 1. An animal can enter and leave the animal litter box 1 from the cover opening 41.

The side wall portions 42 are wall-shaped portions respectively provided on two lateral sides of the cover opening 41.

The front wall portion 43 is a wall-shaped portion provided on the front side of the cover opening 41, and the back wall portion 44 is a wall-shaped portion provided on the back side of the cover opening 41. By providing such wall portions (the side wall portions 42, the front wall portion 43, and the back wall portion 44), the granules S (see FIG. 6) and excrement are prevented from spilling or scattering outside the animal litter box 1 (upper container 10). Further, in one or more embodiments, as shown in FIGS. 1 and 2, the side wall portions 42 are formed such that the height of the side wall portions becomes lower as it goes forward. Accordingly, in the back side, the granules S and excrement are prevented from scattering, whereas in the front side, it is possible to ensure a wide visibility of the animal so as to easily confirm the outside situation from inside the litter box. By ensuring sufficient visibility even during excretion, the animal can use the animal litter box 1 at ease.

The overhanging portion 45 is a portion overhanging downward from the lower ends of the side wall portions 42, the front wall portion 43, and the back wall portion 44. In one or more embodiments, the side wall portions 42, the front wall portion 43, the back wall portion 44, and the overhanging portion 45 are integrally formed. Further, the cover 40 does not have a bottom surface and penetrates in the vertical direction.

As shown in FIG. 2, in the overhanging portion 45, at positions opposite to each other in the lateral direction, fitting pieces 450 each having a through hole 450a are formed overhanging downward. It should be noted that, in FIG. 2, only one fitting piece 450 of the two fitting pieces 450 is shown. The through hole 450a is to be fitted with the protruding portion 352a of the lower container 3 when the cover 40 is attached to the lower container 30 to which the upper container 10 is mounted. In one or more embodiments, the through hole 450a is formed in a shape of a cat face.

Figure 6:
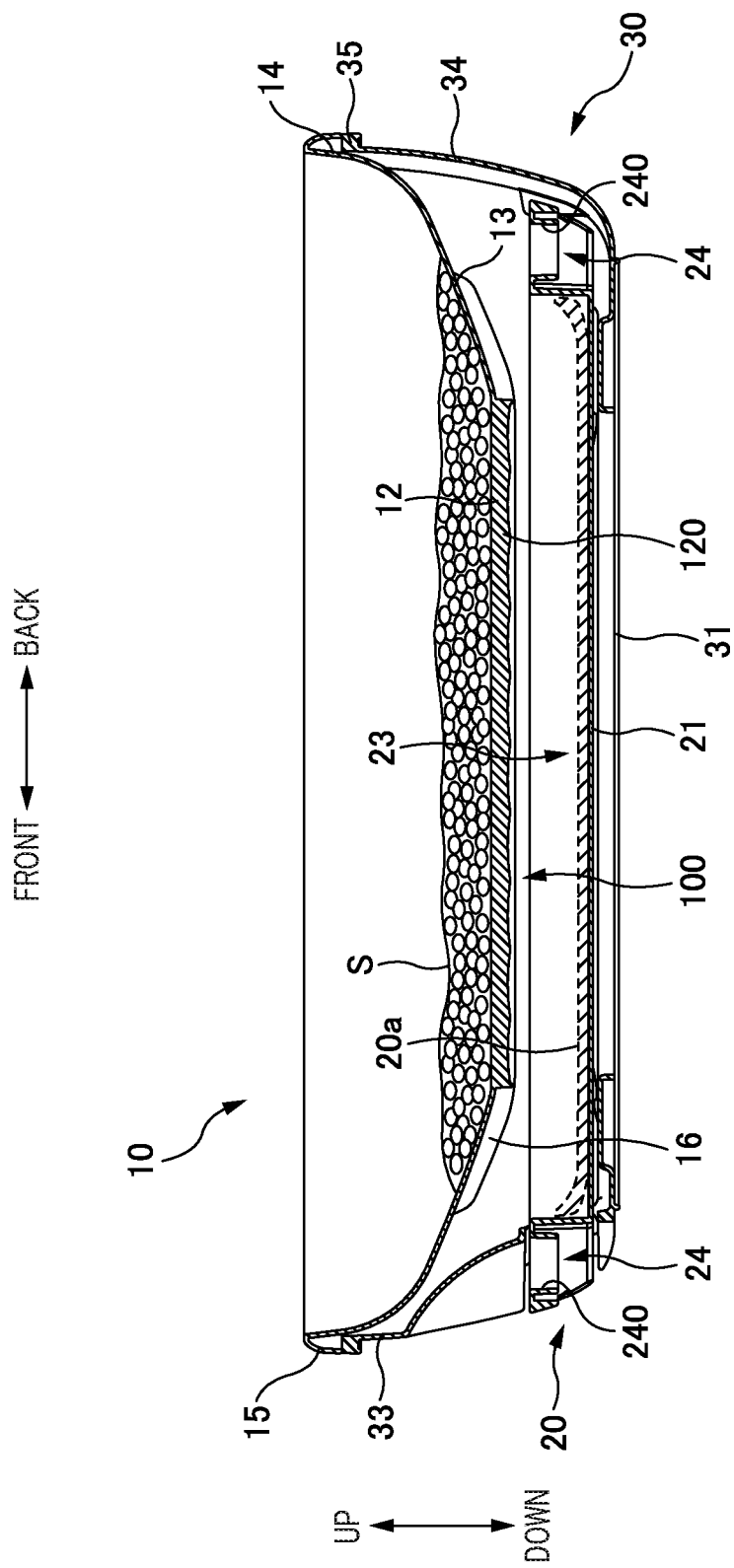
FIG. 6 is a schematic cross-sectional view of the animal litter box according to one or more embodiments taken along the front-back direction.

FIG. 6 is a schematic cross-sectional view of the animal litter box 1 taken along the front-back direction. It should be noted that the cover 40 is not shown in FIG. 6.

When the animal litter box 1 is to be used, the granules S such as cat litter are placed on the urine passage portion 100 as shown in FIG. 6, and an animal such as a cat performs excretion on the granules S. The granules S exhibit effects of moisture removal and deodorization by absorbing an ammonia component upon coming into contact with urine or the like excreted by an animal. Further, by placing the granules S in the urine passage portion 100, it makes an animal more likely to recognize that the place (urine passage portion 100) is a location where excretion is intended. It should be noted that, in one or more embodiments, stone sand formed of zeolite is placed as the granules S. Details of the granules S (stone sand) will be described later.

When an animal such as a cat performs excretion, the animal enters the animal litter box 1 from the cover opening 41, and the animal excretes urine or the like to a portion of the urine passage portion 100 in which the granules S are placed on the upper surface of the upper container 10. The excreted urine passes through the plurality of holes 12a of the urine passage portion 100 and drops downward while being in contact with the granules S. The urine is absorbed by the absorbent body 20a arranged below the urine passage portion 100 and is stored in the tray 20.

Configuration Example of Urine Passage Portion 100

As described above, the urine passage portion 100 has the plurality of cross ribs 110 and the plurality of longitudinal ribs 120. The cross ribs 110 are provided extending along the lateral direction and connect the plurality of longitudinal ribs 120 arranged side-by-side in the lateral direction. Further, the longitudinal ribs 120 are provided extending along the front-back direction and connect the plurality of cross ribs 110 arranged side-by-side in the front-back direction.

Figure 7A:
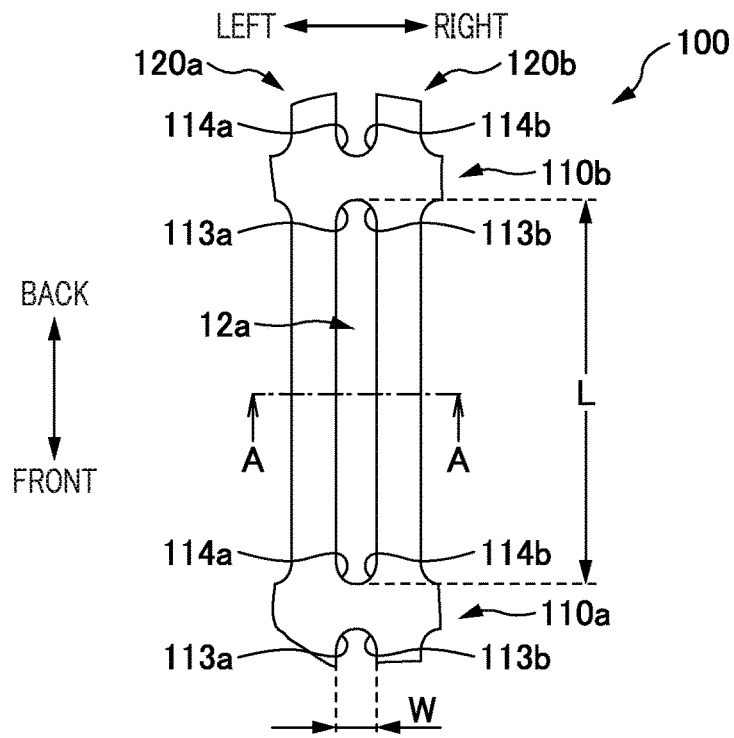
FIG. 7A is an enlarged view of a part of a urine passage portion according to one or more embodiments.
Figure 7B:
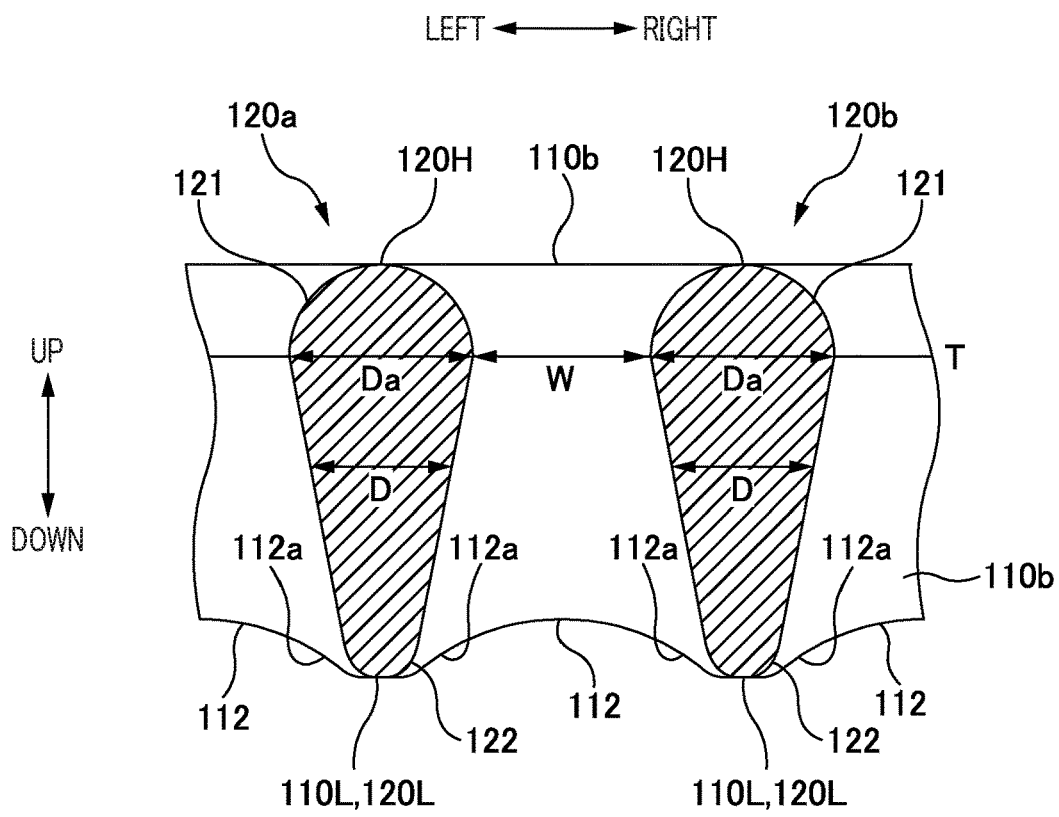
FIG. 7B is a cross-sectional view taken along the line A-A in FIG. 7A.

FIG. 7A is an enlarged view of a part of the urine passage portion 100, and FIG. 7B is a cross-sectional view taken along the line A-A in FIG. 7A. It should be noted that, for convenience, FIG. 7B shows a cross section in the case where a curved portion is not provided at the lower end of the longitudinal rib 120.

In the following description, among the two cross ribs 110 that are adjacent to each other, the cross rib 110 positioned on the front side is referred to as a "front cross rib 110a", and the cross rib 110 positioned on the back side is referred to as a "back cross rib 110b".

Further, among the two longitudinal ribs 120 that are adjacent to each other, the longitudinal rib 120 positioned on the left side is referred to as a "left longitudinal rib 120a", and the longitudinal rib 120 positioned on the right side is referred to as a "right longitudinal rib 120b". Further, in one or more embodiments, the cross ribs 110 and the longitudinal ribs 120 are formed as a single unit, but this is not essential. The cross ribs 110 and the longitudinal ribs 120 may be shaped as separate components and joined.

As shown in FIG. 7A, in one or more embodiments, the distance L between two adjacent cross ribs 110 (the front cross ribs 110a and the back cross ribs 110b) is longer than the distance between two adjacent longitudinal ribs 120 (the opening width W of the hole 12a) (L>W). Therefore, the hole 12a whose outer periphery is surrounded by the cross ribs 110a and 110b and the longitudinal ribs 120a and 120b has a slit shape that is elongated in the front-back direction. That is, in one or more embodiments, the front-back direction corresponds to the longitudinal direction of the hole 12a, and the lateral direction corresponds to the width direction of the hole 12a.

Further, as shown in FIG. 7A, in the portion of the cross rib 110 that is connected to the longitudinal rib 120, there are provided front curved surfaces 113a and 113b and back curved surfaces 114a and 114b that are curved toward the longitudinal rib 120.

In one or more embodiments, as shown in FIG. 7A, the front curved surface 113a that is curved toward the left longitudinal rib 120a and the front curved surface 113b that is curved toward the right longitudinal rib 120b are continuously formed. Therefore an arc surface is formed extending from the left longitudinal rib 120a to the right longitudinal rib 120b, on the front side of the cross rib 110. Similarly, on the back side of the cross rib 110, an arc surface is formed of the back curved surface 114a that is curved toward the left longitudinal rib 120a and the back curved surface 114b that is curved toward the right longitudinal rib 120b.

Therefore, the hole 12a whose outer periphery is surrounded by the front cross rib 110a, the back cross rib 110b, the left longitudinal rib 120a, and the right longitudinal rib 120b has a rounded shape formed of the front curved surfaces 113a and 113b and the back curved surfaces 114a and 114b. Accordingly, compared with the case where the cross ribs 110 are connected to the longitudinal ribs 120 at a right angle (the case where the holes 12a each have a rectangular shape), a connection portion where the cross rib 110 and the longitudinal rib 120 are connected becomes a smooth curved surface, and thus dirt such as urine is less likely to be accumulated in the connection portion. Specifically, in the case where the hole 12a has a rectangular shape (the cross rib 110 and the longitudinal rib 120 are connected at a right angle), when urine remains at any end portion (any side) of the hole 12a, the urine is likely to accumulate at two corner locations. In contrast, when the end portions each have an arc shape as in one or more embodiments, urine is likely to accumulate at one location. Therefore, since the amount of urine accumulated is decreased compared with the case of the rectangular shape, the animal litter box is more hygienic.

The above-described opening width W is the width of a portion of the hole 12 that is not rounded (a portion having the largest lateral length), and corresponds to the maximum width of the hole 12a in the lateral direction (width direction).

It should be noted that the front curved surfaces 113a and 113b and the back curved surfaces 114a and 114b does not have to be provided (the hole 12a does not have to be formed in a rectangular shape).

As shown in FIG. 7B, in the cross rib 110, on the lower side of the portion of the cross rib 110 that is connected to the longitudinal rib 120, there is provided a lower inclined surface 112a that is inclined obliquely upward from the longitudinal rib 120. Accordingly, dirt such as urine is less likely to be accumulated in the boundary portion between the cross rib 110 and the longitudinal rib 120, and this makes brushing or the like easier, facilitating cleaning.

Further, at the lower end of the cross rib 110, a curved portion 112 that is curved upward in an arc shape is provided extending between two longitudinal ribs 120 that are adjacent to each other, and a part of the curved portion 112 serves as a lower inclined surface 112a. Providing the curved portion 112 makes urine or the like that has flowed down along the cross rib 110 from above is not accumulated on the lower part of the cross rib 110, becoming more likely to flow downward along the curved portion 112. This makes urine or the like easier to flow down toward the lower container 30 (the drainage of urine is improved).

In FIG. 7B, a lowermost part 110L of the cross rib 110 corresponds to the boundary with the longitudinal rib 120 in the lower inclined surface 112a. In one or more embodiments, the vertical position of the lowermost part 110L is the same as the vertical position of a lowermost part 120L of the longitudinal rib 120. Here, the lowermost part 120L of the longitudinal rib 120 is a portion of the longitudinal rib 120 that protrudes farthest downward.

It should be noted that, as described above, FIG. 7B shows a cross section in the case where a curved portion is not provided at the lower end of the longitudinal ribs 120. However, a curved portion that is curved upward may be provided at the lower end of the longitudinal ribs 120, extending between two cross ribs 110 that are adjacent to each other. Also in this case, urine or the like is made more likely to flow downward along the curved portion of the longitudinal rib 120, making it easier to flow down toward the lower container 30. As described above, providing the curved portion in at least either of the cross ribs 110 and the longitudinal ribs 120, it is possible to improve the drainage of urine compared with the case where the curved portion is not provided.

In the longitudinal ribs 120, at a predetermined position in the vertical direction between the uppermost part 120H and the lowermost part 120L (e.g., the lower surface of the bottom portion 12), the dimension D in the width direction (lateral direction) is the maximum dimension Da. In the following description, the position of a portion where the longitudinal rib 120 has the maximum dimension Da (the position in the vertical direction) will also be referred to as a position T.

Further, in the longitudinal rib 120, the uppermost part 120H and two widthwise end portions located at the position T are connected by an upper curved surface 121 (corresponding to the curved surface). The upper curved surface 121 is a curved surface that is curved upward, and in one or more embodiments, the upper side with respect to the position T of the longitudinal rib 120 has a semicircular shape. This makes urine or the like less likely to be accumulated on the upper part of the longitudinal rib 120 and more likely to flow downward. Further, as described later, the granule S can be easily removed when the granule S is caught in the hole 12a.

Further, as shown in FIG. 7B, in the longitudinal rib 120, a lower curved surface 122 that extends downward and is curved is provided below the position T, and the lower curved surface 122 and the lower inclined surface 112a of the cross rib 110 are continuous. Therefore, in one or more embodiments, the curved portion 112 of the cross rib 110 and the lower curved surface 122 of the longitudinal rib 120 are smoothly continuous.

By providing the lower curved surface 122 also in the lower side of the longitudinal rib 120, urine or the like that has flowed down along the longitudinal rib 120 from the upper side is not accumulated on the lower part of the longitudinal rib 120, and directly flows down toward the lower container 30. Furthermore, since the lower curved surface 122 of the longitudinal rib 120 and the curved portion 112 of the cross rib 110 are smoothly continuous, it is possible to suppress the accumulation of dirt such as urine at the boundary portion between the cross rib 110 and the longitudinal rib 120.

Further, below the position T of the longitudinal rib 120, the dimension D decreases toward the lower end. Accordingly, the urine or the like that has flowed down from above along the longitudinal rib 120, or that has flowed down along the curved portion 112 of the cross rib 110 are accumulated in the lowermost part 120L and become large droplets, and the urine is more likely to fall down with its own weight, thereby improving the drainage of urine. It should be noted that the dimension D does not necessarily have to decrease toward the lower end of the longitudinal rib 120. Further, the curved surface (upper curved surface 121) above the position T does not necessarily have to exist. For example, the longitudinal ribs 120 may have a rectangular cross section.

Relationship Between Granules S and Urine Passage Portion 100

Figures 8A, 8B:
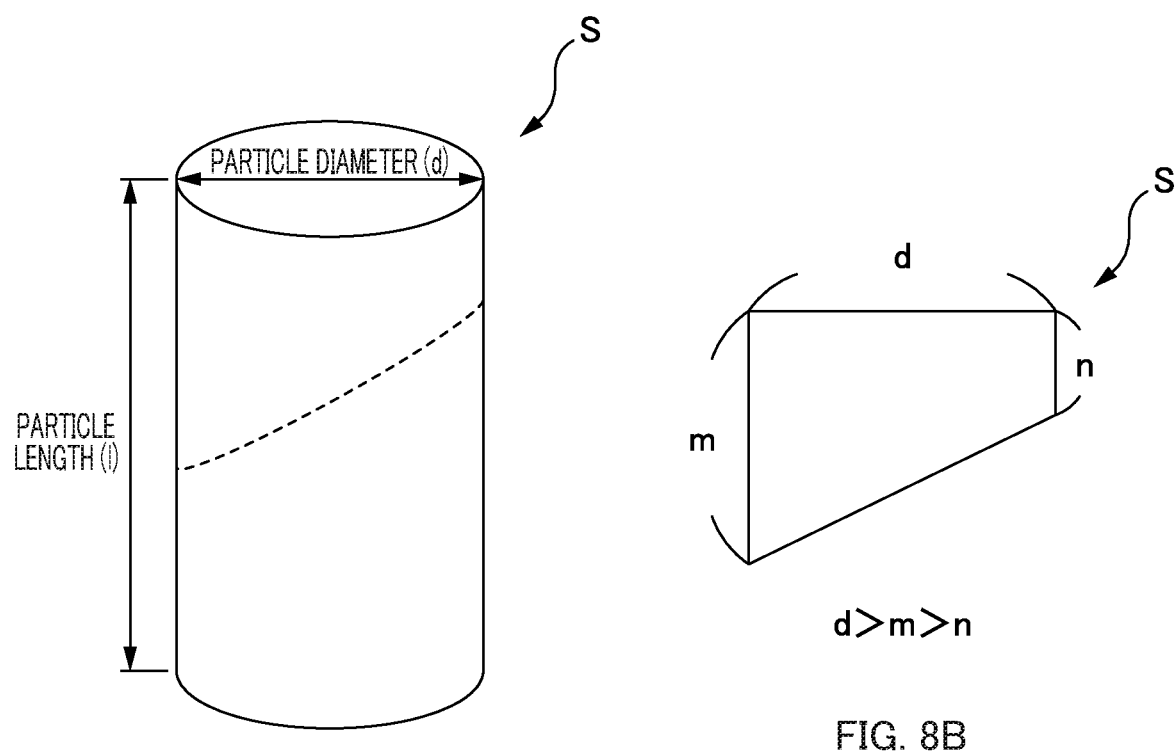
FIG. 8A is a schematic perspective view of a granule.
FIG. 8B is a schematic side view of a chipped granule.

FIG. 8A is a schematic perspective view of the granule S.

FIG. 8B is a schematic side view of the chipped granule S.

The granule S of one or more embodiments is stone sand formed of zeolite and is shaped into a cylindrical shape as shown in FIG. 8A. In the state in FIG. 8A (non-chipped state), the particle diameter d of the granule S is 5.5 mm and the particle length l of the granule S is 10.0 mm.

However, such a granule S (stone sand) is chipped in some cases, for example, when the product is distributed or when the granule is stirred or stepped on by an animal (such as a cat). FIG. 8B shows a part of the granule S in the case of being chipped along the dashed line in FIG. 8A. In FIG. 8B, the maximum length of the granule S in the particle length direction is defined as a length m (m<l), and the minimum length is defined as a length n (n<m).

As described above, the hole 12a of the urine passage portion 100 is formed having a size that does not allow the passage of the granule S. Specifically, the hole 12a is provided having the opening width W of 2.7 mm, and the granule S (particle diameter d: 5.5 mm, particle length l: 10.0 mm) in FIG. 8A is not caught in the hole 12a. However, in the case where the granule S is chipped as shown in FIG. 8B, there is a risk that the chipped granule S is caught in the hole 12a (between the longitudinal ribs 120 that are adjacent to each other in the width direction). Further, when the granule S is caught in the hole 12a, the granule cannot be easily removed, it is no longer hygiene, and labour for preparing a special tool is needed. Therefore, in order to make the chipped granule S less likely to be caught even in the case where the granule S is chipped, the conditions of the holes 12a of the liquid passage portion 100 were examined. It should be noted that, here, as the granule S, a granule whose length m is smaller than the particle diameter d (specifically, a particle diameter less than 5.5 mm) was selected (that is, d>m>n).

FIG. 9 is a diagram illustrating the relationship between the shape of the granule S and the number of times of clogging. Here, the same test as the later-described particle clogging test was conducted several times, and the number of times of clogging of the clogged granule S (particles) and the length m and the length n of the granule were evaluated. It should be noted that the test was conducted under the condition that the opening width W of the hole 12a is 2.5 mm.

In FIG. 9, the particle whose number of times of clogging is 5 is one that is particularly likely to clog. For the particles that are particularly likely to clog (particles whose number of times of clogging is 5), the average value of the length n was 1.98 mm, and the average value of the length m was 3.06 mm. The average value of m+n was 5.04 mm, and the average value of m−n was 1.08 mm.

Figure 10:
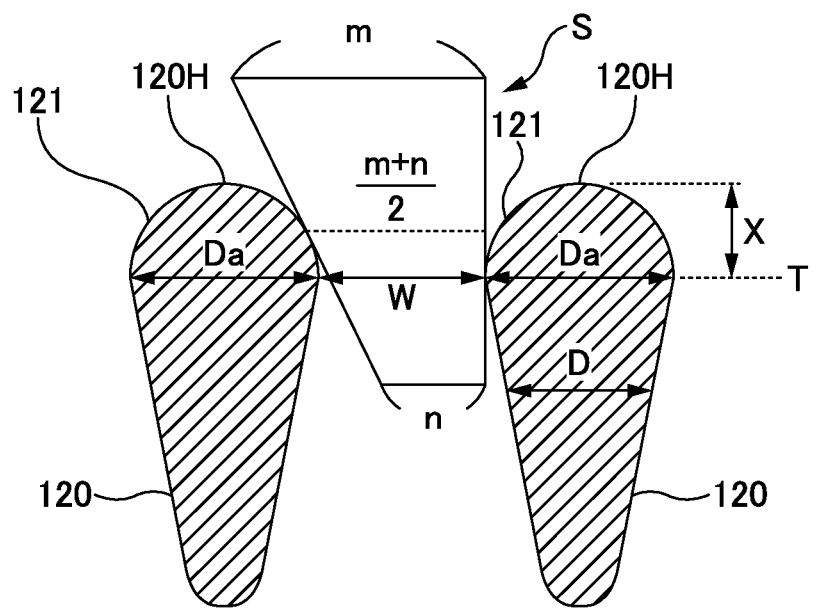
FIG. 10 is a diagram illustrating a state where the granule is caught in a hole (between longitudinal ribs).

FIG. 10 is a diagram illustrating an example of a state where the granule S is caught in the hole 12a (between the longitudinal ribs 120). As shown in the drawing, in the case where the length n of the granule S is smaller than the opening width W of the hole 12a (the space between the adjacent longitudinal ribs 120), there is a risk that the granule S enters the hole 12. However, as shown in FIG. 10, in the case where the opening width W is smaller than (m+n)/2, the amount of particles entering the hole 12a is small and the particle is less likely to be caught.

As described above, since the average value of m+n of the particularly-likely-to-clog particle is 5.04 mm, it is desirable that the opening width W is less than 5.04/2=2.52 (mm). Also in the later-described particle clogging test, it was confirmed that setting the opening width W to 2.5 mm or less makes it possible to reduce the clogging compared with the conventional width (2.7 mm).

However, if the opening width W is made excessively small, there is a risk that the liquid permeability (the liquid permeability in a state where a plurality of granules S are placed on the urine passage portion 100) is decreased and urine remains in the urine passage portion 100. Therefore, it is desirable that the opening width W is in a range in which the liquid permeability can be maintained at 90% or more. Specifically, it is desirable that the opening width W is 1.7 mm or more (see the liquid permeation test described later). This makes it possible to reduce the amount of urine remaining in the urine passage portion 100, making an offensive odor less likely to be generated. It should be noted that a method for calculating the liquid permeability and the like will be described later.

It should be noted that, in a range that satisfies the above-described dimensions, it is desirable that the opening width W is larger than the maximum dimension Da of the longitudinal ribs 120. For example, in the case where the maximum dimension Da of the longitudinal ribs 120 is 2.2 mm, it is desirable that 2.2<the opening width W≤2.5 is satisfied. Also in this case, since the opening width W is 2.5 mm or less, the granules S can be made less likely to be caught. However, the configuration is not limited thereto, and the opening width W may be equal to or smaller than the maximum dimension Da of the longitudinal ribs 120. For example, in the case where the maximum dimension Da of the longitudinal ribs 120 is 2.2 mm, a configuration is acceptable in which 2.2≥W≥1.7.

In addition, in one or more embodiments, the uppermost part 120H of the longitudinal rib 120 and the end portions in the width direction (lateral direction) at the position T are connected by the upper curved surface 121. Accordingly, when the granule S is caught in the hole 12a, the granule S can be moved along the upper curved surface 121 of the longitudinal rib 120. Thus, the granule S is easily removed.

Figure 11:
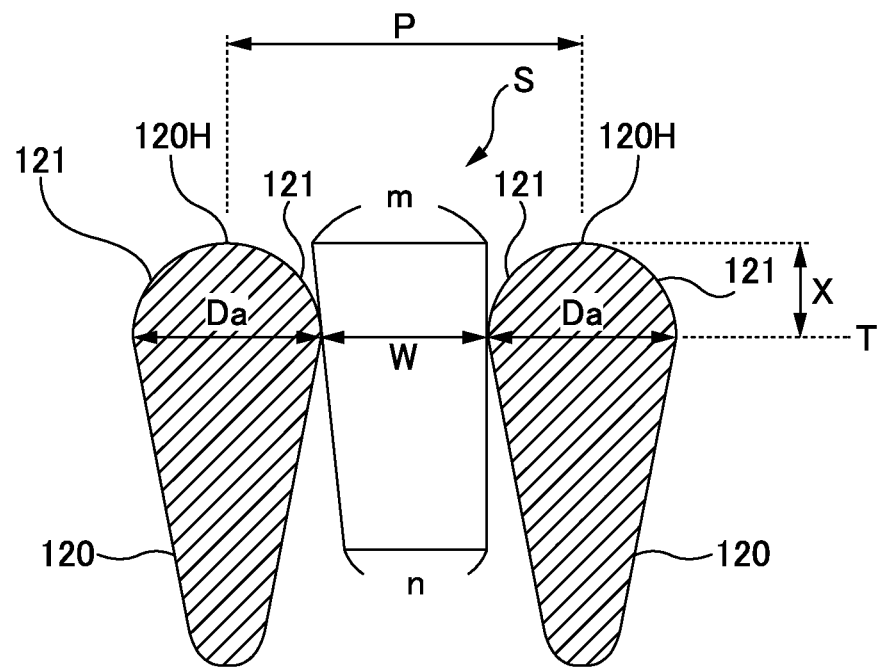
FIG. 11 is a diagram illustrating a state where a granule that is particularly likely to clog is clogged farthest deeply.

FIG. 11 is a diagram illustrating a state where a granule S that is particularly likely to clog is clogged farthest deeply. It should be noted that, among the particularly easily cloggable particles (the particles whose the number of times of clogging is 5), the particle that is closest to the back of the hole 12a is the particle having the smallest difference (m−n) between the length m and the length n (in FIG. 9, the particle having a length n of 2.12 mm and a length m of 2.62 mm). FIG. 11 shows a state where the particle (granule S) is clogged in the hole 12a.

The particle (granule S) shown in FIG. 11 enters deeply between the longitudinal ribs 120. In this state, the vertical length of a portion of the granule S that protrudes upward beyond the position T of the longitudinal rib 120 was approximately one (1.1 mm) of the five equal divisions of the particle diameter d (5.5 mm) of the granule S. In the case where the length X in the longitudinal rib 120 (a difference between the uppermost part 120H and the position T) is larger than 1.1 mm, the granule cannot be removed when the granule is caught as shown in the drawing. Therefore, it is desirable that the length X of the longitudinal rib 120 is 1.1 mm or less.

Further, it is desirable that half of the maximum dimension Da of the longitudinal rib 120 (Da/2) is 1.1 mm or less (in other words, it is desirable that the maximum dimension Da is 2.2 mm or less). In the case where Da/2 is larger than 1.1 mm, when the granule S is caught as shown in FIG. 11, the granule S cannot be removed by moving it upward from the longitudinal rib 120. Setting Da/2 to 1.1 mm or less (maximum dimension Da is 2.2 mm or less) makes it possible to remove the granule S by moving it upward from the longitudinal rib 120.

Further, since a widthwise center-to-center distance P of the longitudinal ribs 120 that are adjacent to each other in the width direction (lateral direction) (a distance between the uppermost parts 120H) is the opening width W+(2×Da/2), it is desirable that the distance P is 2.5+2.2=4.7 (mm) or less. Accordingly, the granule S can be removed by moving it upward from the longitudinal rib 120.

Further, when W+Da is 4.7 (mm) or less, the number of longitudinal ribs 120 per unit area increases. Therefore, the bottom portion 12 is less likely to be bent and the aperture is not formed, making the granule S less likely to be caught. It should be noted that, it is desirable that a longitudinal center-to-center distance between the cross ribs 110 that are adjacent to each other in the longitudinal direction (front-back direction) is 5 to 50 mm. In the case where the center-to-center distance is 50 mm or more, there is a risk that the bottom portion 12 (urine passage portion 100) is bent due to applying the load of the animal, and there is a risk that the granule S is likely to be caught when the bottom portion returns from the bent state to the original state.

Further, it is desirable that the ratio P/X of the center-to-center distance P (here, W+Da) to the length X of the longitudinal rib 120 (here, Da/2) is 4.3 or less (more preferably, 4.1 or less). In this case, the height from the uppermost part 120H to the position H is small, and accordingly even if the granule S enters, the granule S easily leaves the hole 12a. This makes the granule S less likely to be caught. Accordingly, urine is not accumulated, and urine permeation is not hindered, making an offensive odor less likely to generate.

Further, it is desirable that the ratio W/X of the opening width W to the length X of the longitudinal rib 120 is 2.3 or less (more preferably 2.1 or less). This makes the granule S less likely to be caught. Accordingly, urine is not accumulated and urine permeation is not hindered, making an offensive odor less likely to generate.

Further, it is desirable that the ratio W/Da of the opening width W to the maximum dimension Da of the longitudinal ribs 120 is 1.2 or less (more preferably 1.1 or less). In this case, since the space between the longitudinal ribs 120 are narrow, it is possible to suppress the clogging of the granule S. Since the granule S is not clogged, urine is not accumulated, and urine permeation is not hindered, making an offensive odor less likely to generate.

Evaluation Test of Opening Width W

Tests (a particle clogging test and a permeability test) were conducted using a test duckboard, and a suitable range of the opening width W was evaluated.

Particle Clogging Test

Materials which were used

Test duckboard: Same pattern as that of urine passage portion 100 (manufactured with a 3D printer)

Opening width W (mm): 2.7, 2.5, 2.45, 2.4, 2.35, 2.3, 2.0, 1.9, 1.8

Cylindrical member: inner diameter 100 mm, height 30 mm

Granule: Test stone sand of zeolite (fine particles with a particle length of 5 mm or less)

Test Apparatus

Sieve shaker Model: AS-200 manufactured by Retsch GmbH

Speed: 3600 times/min (60 Hz)

Amplitude: 1.80 mm

Time: 1 min

Test Method

FIGS. 12A to 12D are schematic explanatory diagrams illustrating a test method for a particle clogging test.

Figure 12A:
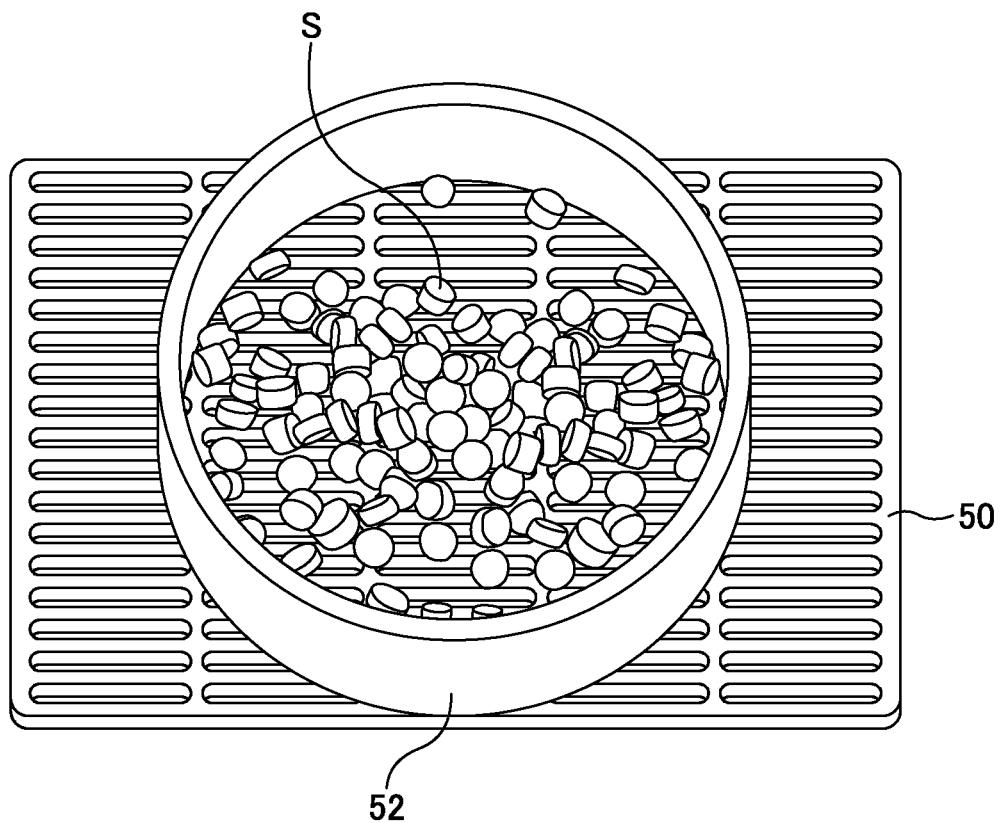
FIG. 12A is a schematic explanatory diagram illustrating a test method for a particle clogging test.

First, as shown in FIG. 12A, a cylindrical member 52 is placed (fixed) in a test duckboard 50, and the granules S (here, stone sand having a particle length of 5 mm or less) is introduced into the cylindrical member 52.

Figure 12B:
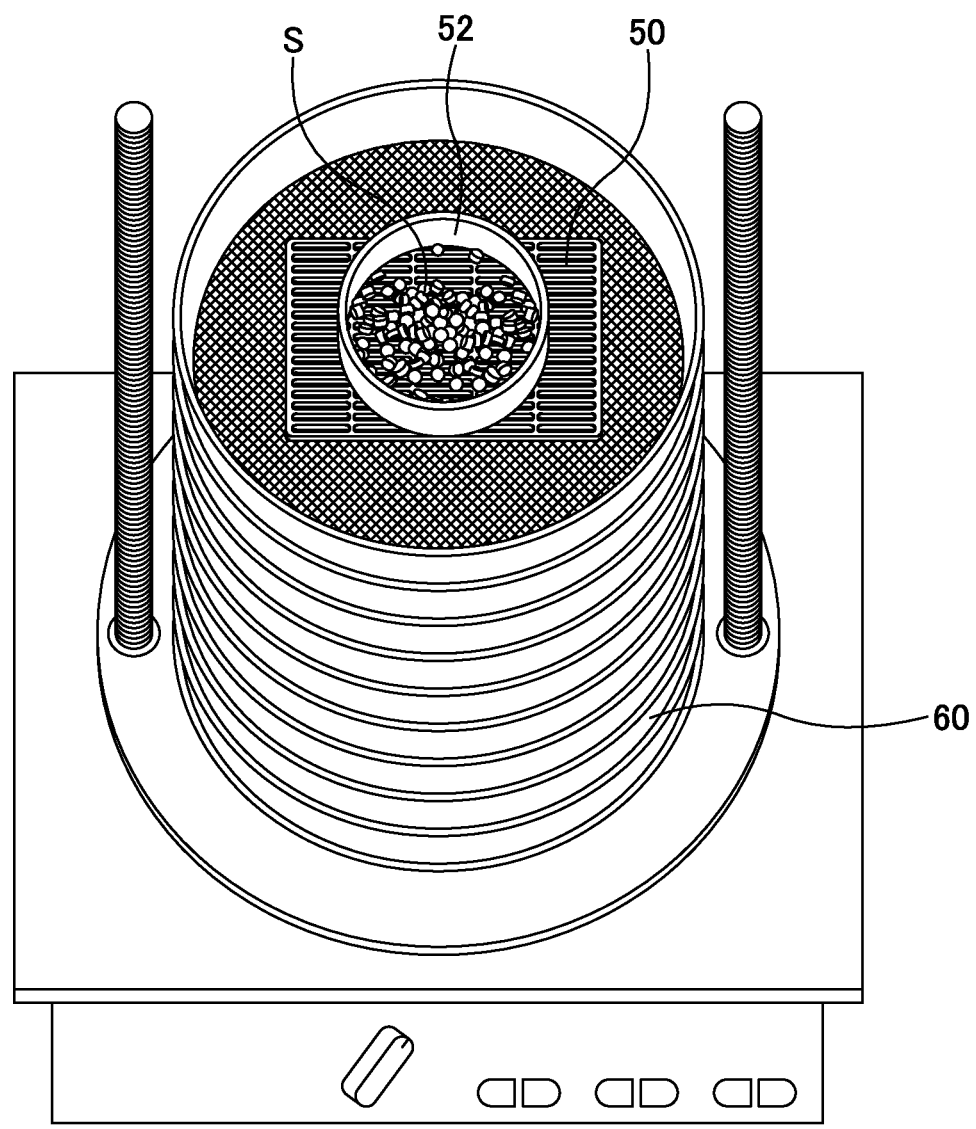
FIG. 12B is a schematic explanatory diagram illustrating the test method of the particle clogging test.

Next, as shown in FIG. 12B, the test duckboard 50 and the like prepared in FIG. 12A are placed on a sieve shaker 60, and the lid (not shown) is closed, and shaking is performed at 60 Hz for 1 minute.

Figure 12C:
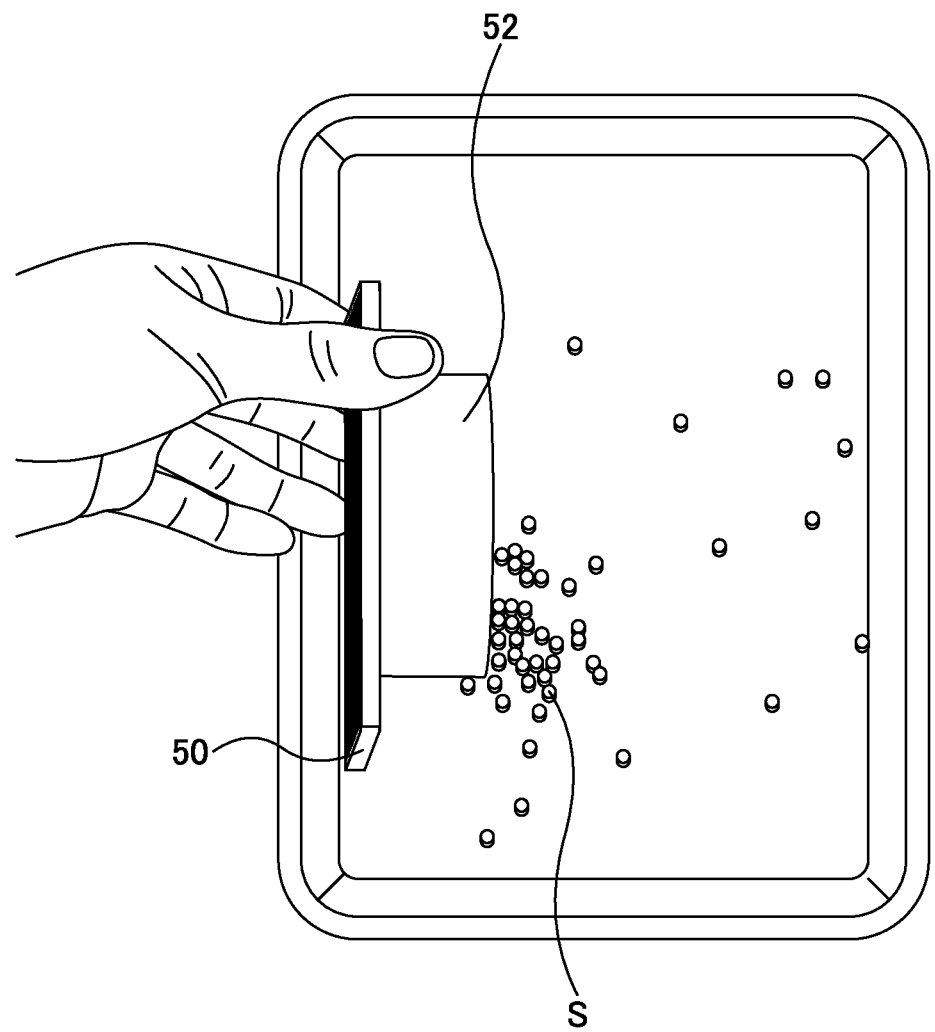
FIG. 12C is a schematic explanatory diagram illustrating the test method of the particle clogging test.

After the shaking is completed, the test duckboard 50 is taken out from the sieve shaker 60 and inclined at approximately 90 degrees as shown in FIG. 12C.

Figure 12D:
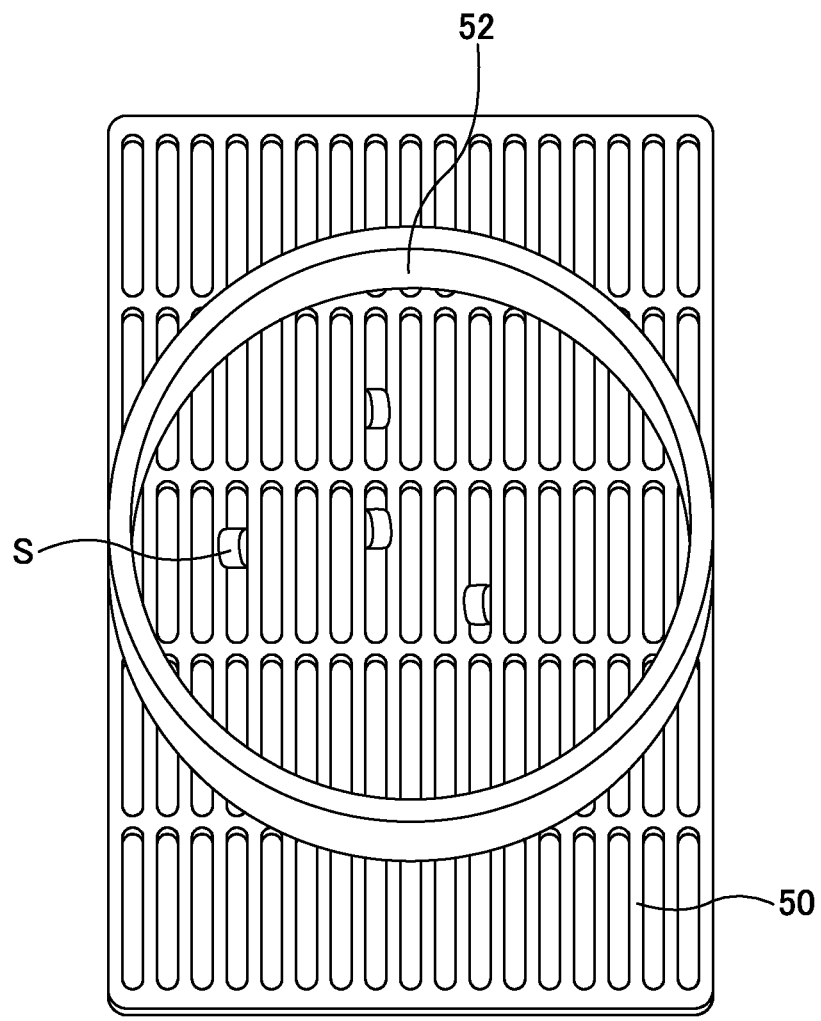
FIG. 12D is a schematic explanatory diagram illustrating the test method of the particle clogging test.

Then, as shown in FIG. 12D, the number of the granules S (stone sand) clogged in the test duckboard 50 is counted.

The above-described test was conducted 10 times for each test duckboard 50 (opening width W), and the numbers (average values) of clogged particles were compared.

Test Results

Figure 13:
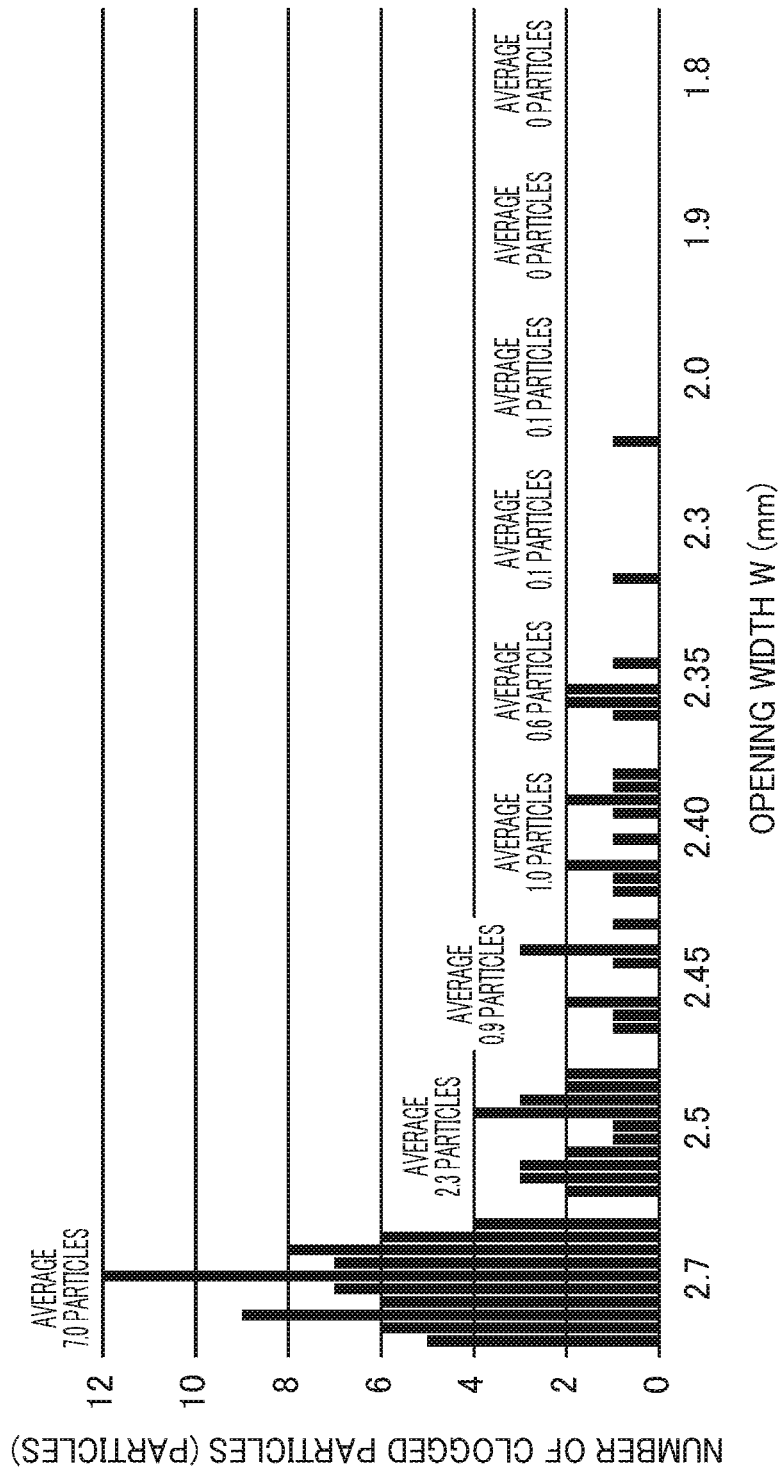
FIG. 13 is a diagram illustrating the test results of the particle clogging test.

FIG. 13 is a diagram illustrating the test results of the particle clogging test. While the average number of clogged particles with an opening width W of 2.7 mm (conventional width) is 7.0 particles, the average number of clogged particles with an opening width W of 2.5 mm is 2.3 particles, which is less than half. That is, it was confirmed that, by setting the opening width W to 2.5 mm, the granules S could be made less likely to be clogged (less likely to be caught) compared with the case where the opening width W is 2.7 mm.

Further, it was confirmed that, when the opening width W was 2.3 mm or less, the average number of clogged particles was 0.1 particles or less and almost no clogging occurred.

Particle Clogging Test in Product state Using stone sand products for system toilets, which are commercially available products of two companies (Unicharm Corporation and Iris Ohyama Inc.) and are mainly made of zeolite, a particle clogging test was conducted in the product state (state not selected by particle length).

Materials which were used
Test duckboard: Same as in the particle clogging test
Opening width W (mm): 2.7, 2.5, 2.3
Cylindrical member: inner diameter 84 mm, height 30 mm
Granule: stone sand manufactured by Unicharm Co., Ltd. and stone sand manufactured by Iris Ohyama Inc.

Test Method

Taking out 50 ml of the granules (stone sand) from the packaged products for each company, the granules is introduced into the cylindrical member provided on the test duckboard, and sieved 20 times with hands. Subsequently, the test duckboard is inclined vertically (approximately 90 degrees), and then the number of particles clogged in the test duckboard is counted. The above-described test was conducted five times per test duckboard (opening width W) for each product (granule), and the average value of the clogged particles was calculated. Further, a numerical value obtained by multiplying the number of clogged particles (average value) by 40 was defined as a 2 L conversion value, and evaluation was performed using the 2 L conversion value.

Test Results

The test results are shown in Table 1.

TABLE 1

| Opening width W | Number of clogged particles (in terms of 2 L) | |
| --- | --- | --- |
| (mm) | Unicharm | Iris Ohyama |
| 2.7 | 40 | 32 |
| 2.5 | 0 | 16 |
| 2.3 | 0 | 0 |

As shown in Table 1, in the case where the opening width W was 2.5 mm, the number of clogged particles was less than half compared with the case where the opening width W was 2.7 mm. Particularly, in the case of stone sand manufactured by Unicharm Corporation, the opening width W was 2.5 mm and no clogging occurred. Further, when the opening width W was 2.3 mm, no clogging occurred in either product.

As described above, in the test using the commercially available products of stone sand made of zeolite, it was confirmed that, by setting the opening width W to 2.5 mm or less, the granules (stone sand) can be made less likely to be clogged (less likely to be caught). Therefore, it can be said that the opening width W is preferably 2.5 mm or less (more preferably 2.3 mm or less).

Liquid Permeation Test

Materials which were used
Test duckboard: Same pattern as that of urine passage portion 100 (manufactured with a 3D printer)
Opening width W (mm): 2.7, 2.5, 2.45, 2.4, 2.35, 2.3, 2.0, 1.9, 1.8, 1.7, 1.6, 1.5
Cylindrical member: inner diameter 84 mm, height 30 mm
Granule: stone sand made of zeolite
Artificial urine: physiological saline Test Method FIGS. 14A to 14C are schematic explanatory diagrams illustrating a test method for a liquid permeation test.

Figure 14A:
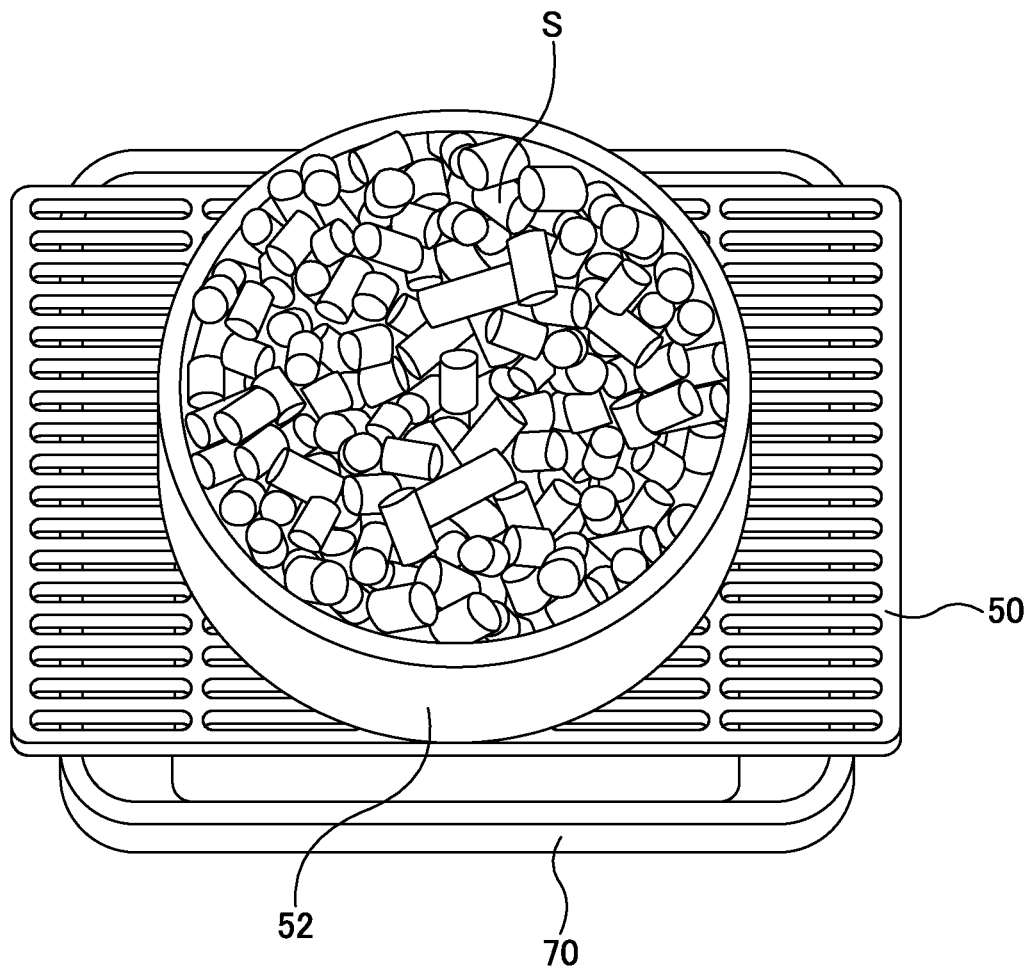
FIG. 14A is a schematic explanatory diagram illustrating a test method for a liquid permeation test.

First, as shown in FIG. 14A, the cylindrical member 52 is placed on the test duckboard 50, a level full of the granules S (stone sand) are put into the cylindrical member 52, and the cylindrical member is arranged on a receiving container 70 having an open upper part.

Figure 14B:
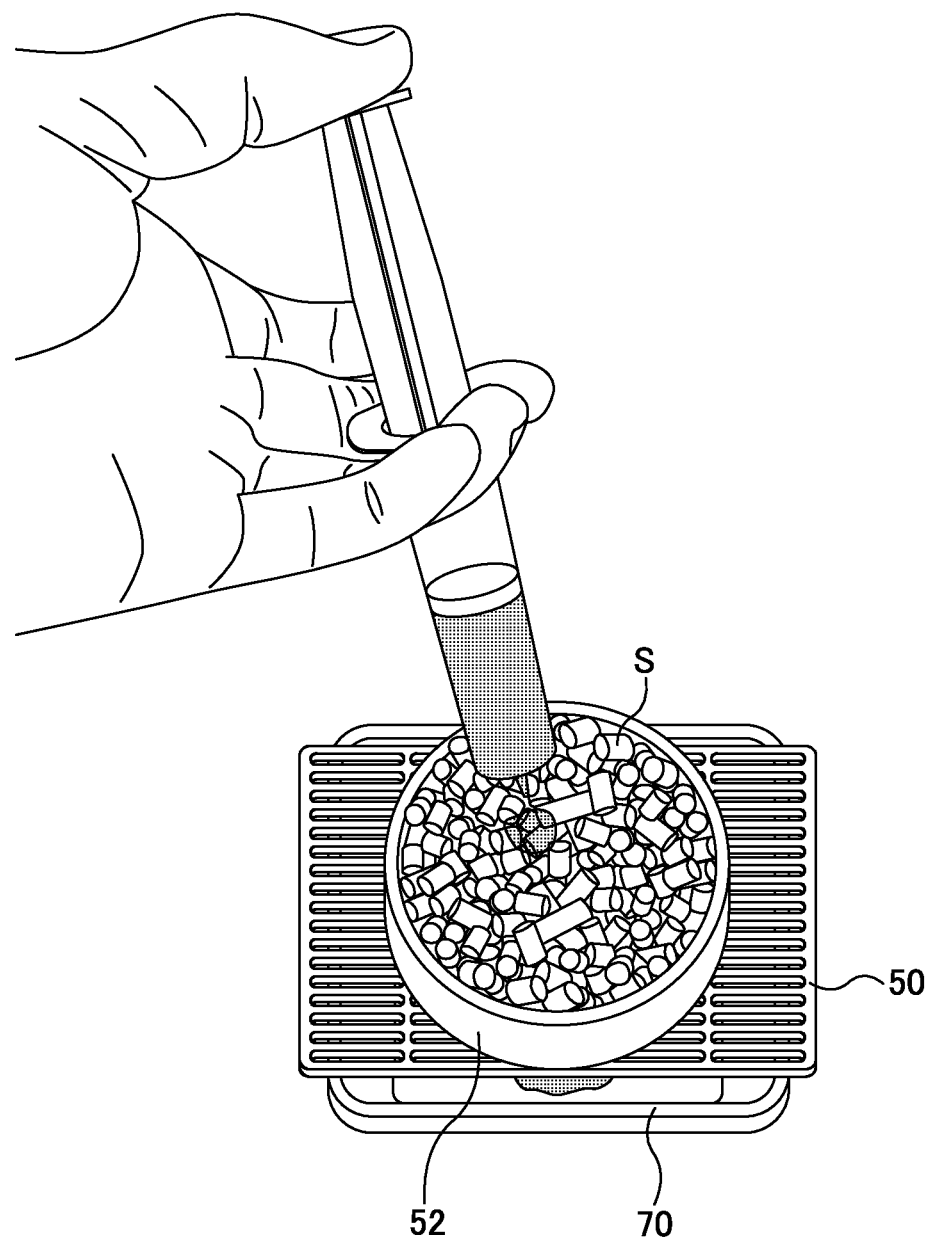
FIG. 14B is a schematic explanatory diagram illustrating the test method for the liquid permeation test.

Next, as shown in FIG. 14B, 20 g of artificial urine is dropped from a height of 20 mm above the cylindrical member 52 by using a syringe or the like, over a period of approximately 10 seconds.

Figure 14C:
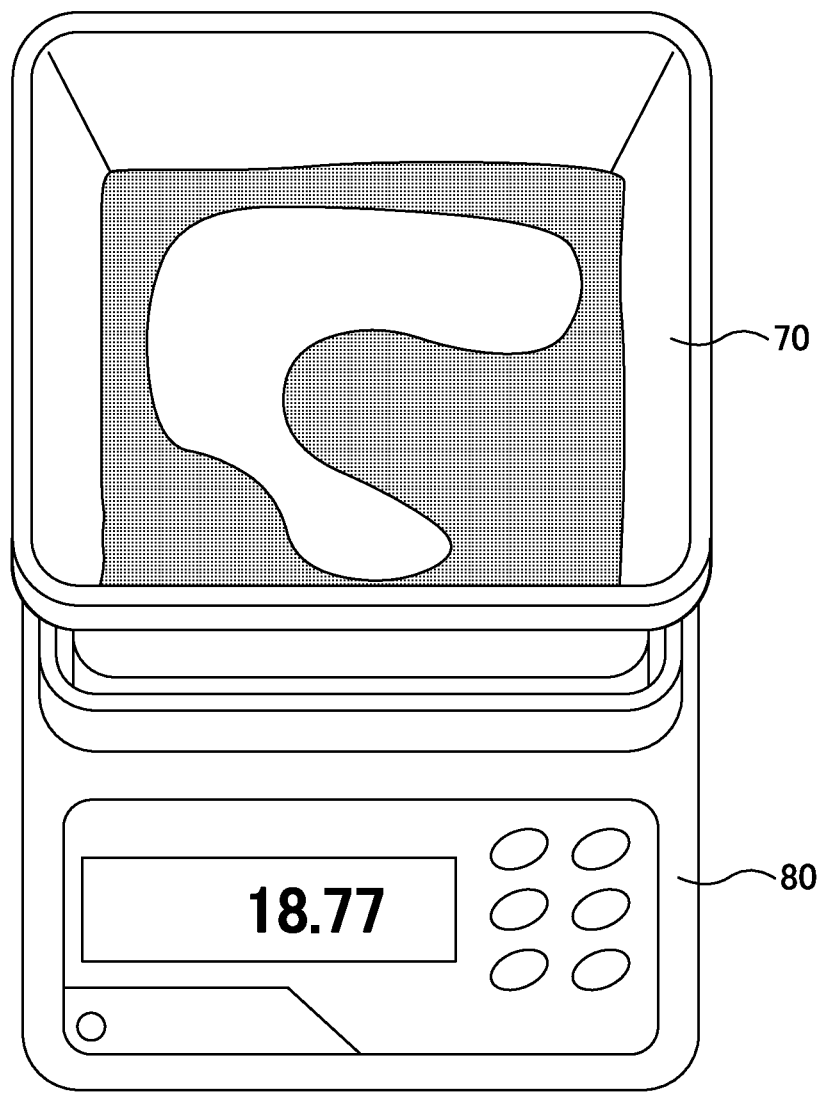
FIG. 14C is a schematic explanatory diagram illustrating the test method for the liquid permeation test.

The artificial urine is allowed to stand (stand still) for 15 seconds after dropping, and then the weight is measured with a weight scale 80 as shown in FIG. 14C. It should be noted that the weight scale 80 is set in advance to zero in a state where only the receiving container 70 is put on. Therefore, in the case of FIG. 14C, the weight of the artificial urine that has passed through the test duckboard 50 is 18.77 g.

Then, the liquid permeability is calculated from the dropping amount (here, 20 g) and the measured weight by Equation (1).

$$\text{Liquid permeability (\%)} = \text{measured weight}/\text{dropping amount} \times 100 \quad (1)$$

For example, in the case where the measured weight is 18.77 g (FIG. 14C), the liquid permeability is 93.85% according to Equation (1). The calculated liquid permeability of 90% or more was defined as acceptable (OK), and the liquid permeability less than 90% was defined as unacceptable (NG)

Test Results

Figure 15:
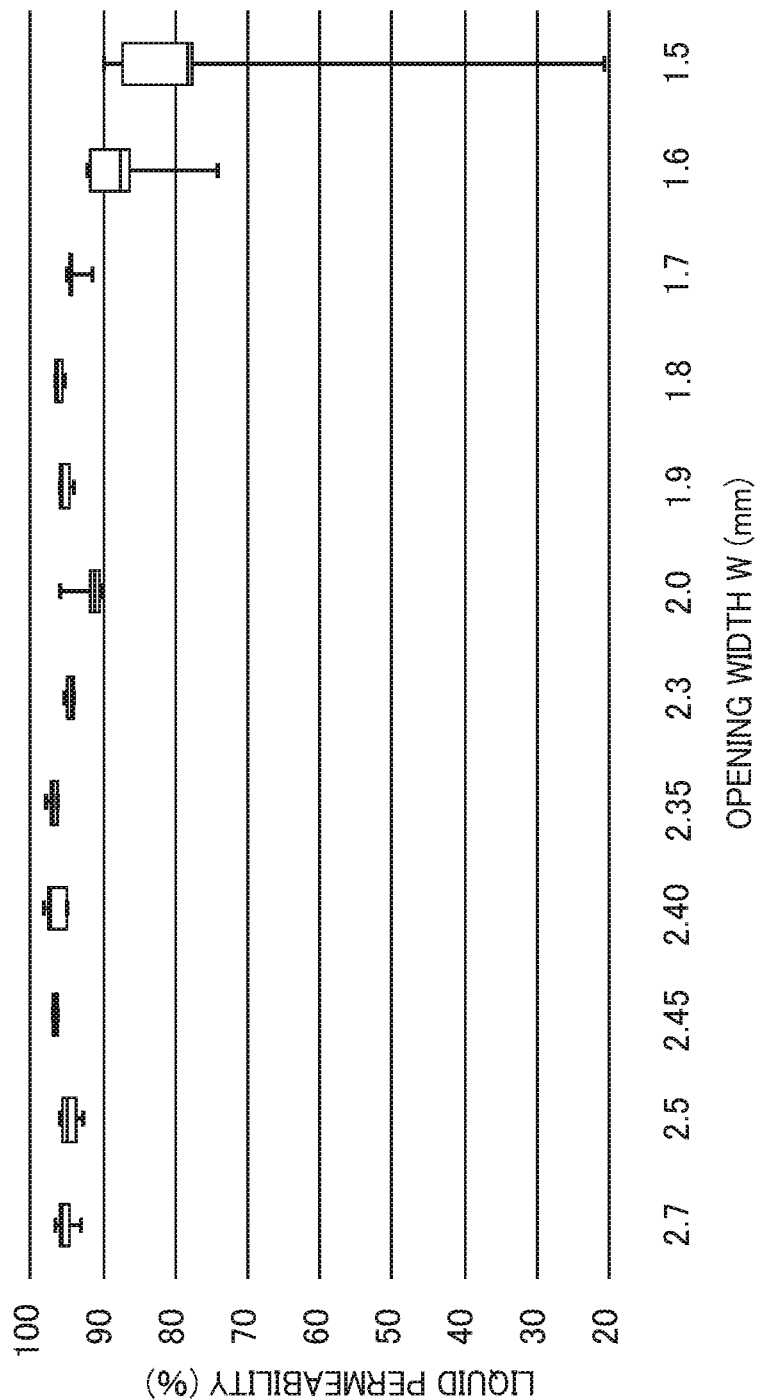
FIG. 15 is a diagram illustrating the test results of the liquid permeation test.

FIG. 15 is a diagram illustrating the test results of the liquid permeation test. In FIG. 15, the horizontal axis represents the opening width W (mm), and the longitudinal axis represents the liquid permeability (%). It should be noted that the liquid permeability test was conducted multiple times for each opening width W (test duckboard 50), and in FIG. 15, the results are shown in the box-and-whisker plot (maximum value, minimum value, and quartile).

In FIG. 15, a liquid permeability of 90% or more is maintained until the opening width W reaches 1.7 mm. However, when the opening width W is 1.6 mm or less, a liquid permeability of 90% or more cannot be maintained (liquid permeability: NG). Therefore, it is desirable that the opening width W is 1.7 mm or more.

Based on the above results (the results of the particle clogging test and the liquid permeation test), it is desirable that the opening width W of the holes 12a is equal to or larger than 1.7 mm and equal to or less than 2.5 mm (more preferably equal to or less than 2.3 mm). Accordingly, while maintaining a liquid permeability of 90% or more, the granules S can be made less likely to be caught.

Other Examples

Although the above embodiments have been described, but the above-described embodiments are intended to facilitate the understanding of the present invention and are not intended to limit the interpretation of the present invention. In addition, the present invention can be modified or improved within the scope of the gist of the present invention, and it is needless to say that equivalents thereof are included in the present invention. For example, modifications which will be described below are possible.

In the above-described embodiments, all the longitudinal ribs 120 (the left longitudinal ribs 120a and the right longitudinal ribs 120*b*) are formed having the same shape, but the configuration is not limited thereto. For example, there may be mixed ribs having different vertical lengths.

Figure 16A:
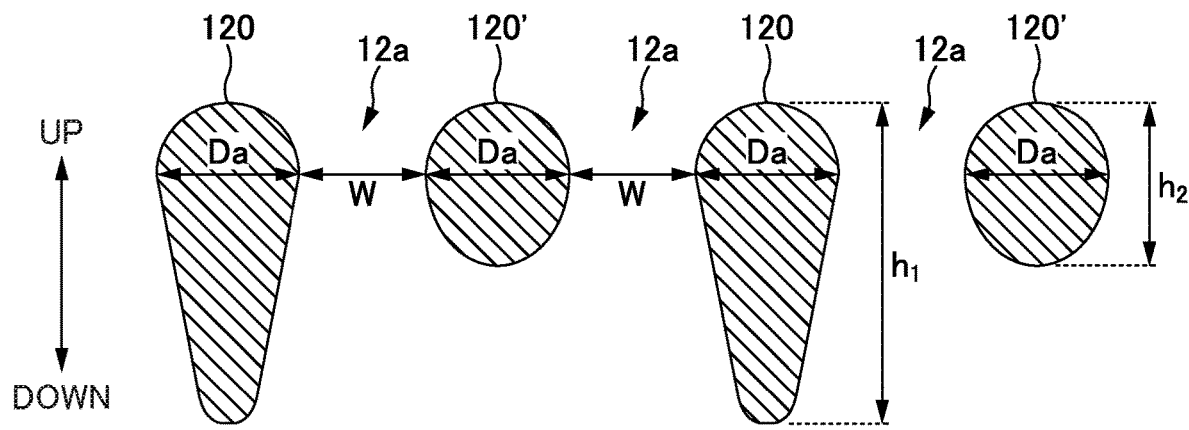
FIG. 16A is an explanatory diagram illustrating modified examples of the longitudinal ribs according to one or more embodiments.
Figure 16B:
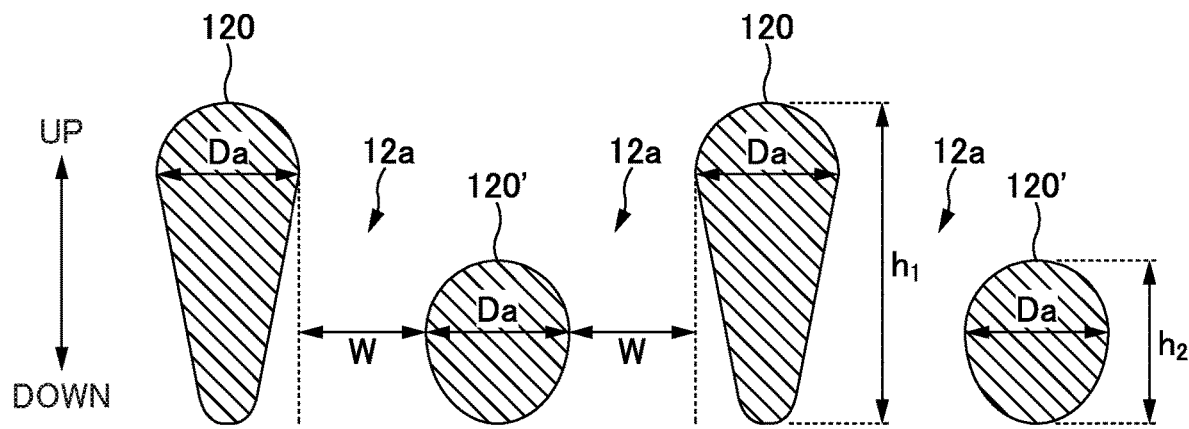
FIG. 16B is an explanatory diagram illustrating modified examples of the longitudinal ribs according to one or more embodiments.

FIGS. 16A and 16B are explanatory diagrams illustrating modified examples of the longitudinal ribs 120. In this modified example, the longitudinal ribs 120 and the longitudinal ribs 120' are alternately arranged. It should be noted that in FIG. 16A, the uppermost positions of the longitudinal ribs 120 and 120' are aligned, and, in FIG. 16B, the lowermost positions of the longitudinal ribs 120 and 120' are aligned.

The longitudinal ribs 120 have the same shape as that of the above-described embodiments, and the vertical length (height) of the longitudinal ribs 120 is $h_1$.

The longitudinal ribs 120' have a vertical length $h_2$ ($<h_1$), and the vertical length is shorter than the vertical length of the longitudinal ribs 120. More specifically, in the longitudinal ribs 120', the length of a portion located below the portion of the maximum dimension Da is shorter than in the longitudinal ribs 120, and the longitudinal ribs 120' are formed in a shape whose cross section is close to a circle.

Accordingly, by arranging the longitudinal ribs 120 having different vertical lengths, even in the case where the granule S is caught between the longitudinal ribs, the caught granule S can be easily removed. It should be noted that in this example, the longitudinal ribs 120 (shapes having different vertical lengths) have two types of shapes. However, the configuration is not limited thereto and three or more types of shapes may be used.

Further, in the above embodiments, the holes 12*a* of the urine passage portion 100 are each formed in a substantially rectangular shape (slit shape) that is elongated in the front-back direction, but the configuration is not limited thereto. For example, the hole may have an elliptical shape. It should be noted that, in a case of elliptical shape, the long axis direction corresponds to the longitudinal direction, and the short axis direction corresponds to the width direction. Also in this case, it is sufficient that the maximum width in the short axis direction (width direction) is 2.5 mm or less (preferably 2.3 mm or less). This can make the granules S less likely to be caught.

Further, in the above embodiments, stone sand of zeolite is used as the granules S, but the present invention is not limited thereto. For example, stone sand of bentonite may be used. Alternatively, silica gel, vegetable-derived sand, paper sand, and the like may be used. For example, as silica gel, "Deo-Toilet Deodorizing Litter" (manufactured by Unicharm Corporation) may be used, and as vegetable derived sand, "Nyantomo Clean Toilet, Deodorizing and Antibacterial Chips" (manufactured by Kao Corporation), "Deo-Toilet Deodorising and Antibacterial Chips" (manufactured by Unicharm Corporation), and "Deo-Toilet Deodoring Litter containing green tea ingredients and no scattering" (manufactured by Unicharm Corporation) may be used. These particles were subjected to the particle clogging test with a duckboard having an opening width of 2.5 mm, and as a result, not a single particle was clogged.

Further, the configuration and shape of the animal litter box is not limited to the above embodiments. For example, the animal litter box 1 of the above embodiments includes four members, namely the upper container 10, the tray 20, the lower container 30, and the cover 40. However, the animal litter box 1 does not have to necessarily include these four members. For example, the following aspect may be employed.

Figure 17:
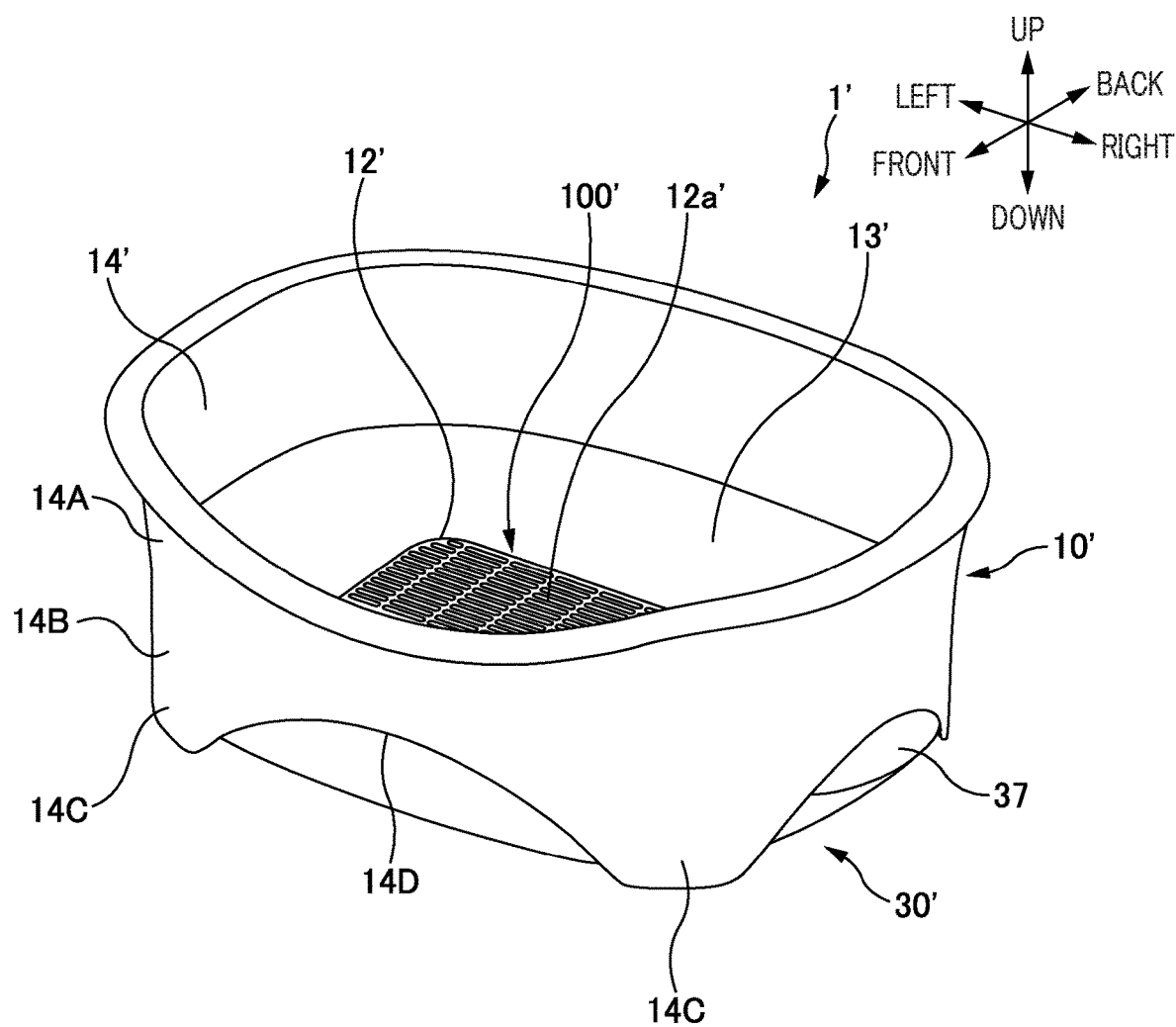
FIG. 17 is a perspective view of an animal litter box according to one or more embodiments.
Figure 18:
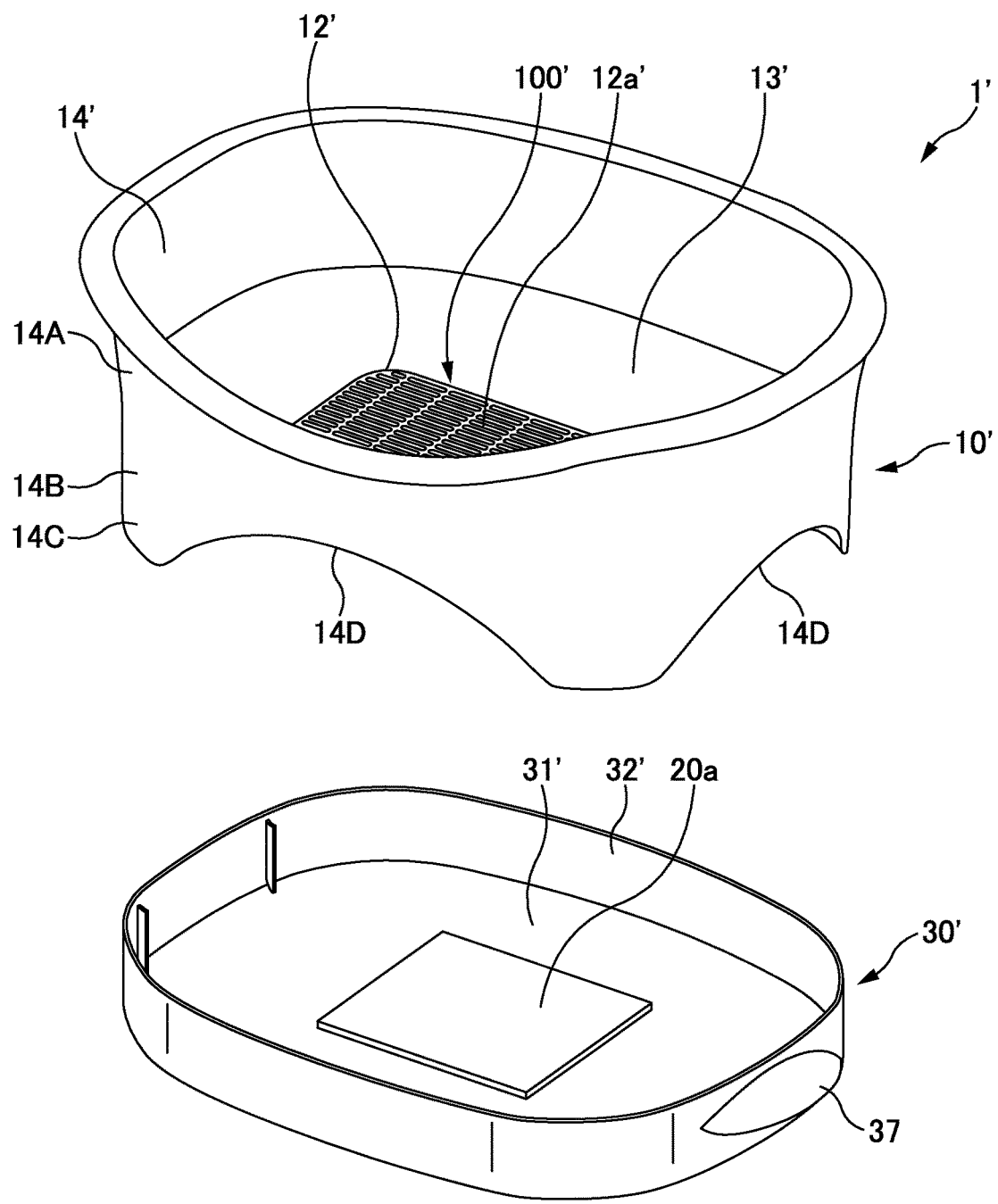
FIG. 18 is an exploded view of the animal litter box according to one or more embodiments.

FIG. 17 is a perspective view of an animal litter box 1', and FIG. 18 is an exploded view of the animal litter box 1'.

As shown in the drawing, the animal litter box 1' includes an upper container 10' and a lower container 30'.

The upper container 10' is a container having an open upper part and includes a bottom portion 12', an outer peripheral portion 13', and a side portion 14'.

The bottom portion 12' is a portion that constitutes the bottom surface of the upper container 10'. The urine passage portion 100' is provided on the bottom portion 12'. Further, the urine passage portion 100' has a plurality of holes 12*a'* for allowing urine to pass through downward, formed therein. The configuration of the urine passage portion 100' is similar to the configuration of the urine passage portion 100 of the animal litter box 1 described above. However, in this example, the directions of the holes 12*a'* (longitudinal ribs and cross ribs) are different from those of the above embodiments, and the hole 12*a'* has a laterally-elongated shape. That is, in this example, the lateral direction corresponds to the longitudinal direction of the hole 12*a'*, and the front-back direction corresponds to the width direction of the hole 12'.

The outer peripheral portion 13' is a portion that surrounds the outside of the bottom portion 12', and forms an upward incline (inclined surface) extending outward from the bottom portion 12'.

The side portion 14' is a wall surface that rises up from the peripheral edge of the outer peripheral portion 13' and constitutes the outer wall of the upper container 10'. The side portion 14' has an upper wall portion 14A and an extension wall portion 14B.

The lower end of the upper wall portion 14A is continuous from the upper end of the outer peripheral portion 13'. The upper wall portion 14A extends to the upper end portion of the upper container 10', and is curved outward at the upper end portion.

As shown in FIGS. 17 and 18, the extension wall portion 14B is a portion that is located on the outer surface side of the upper wall portion 14A and extends downward from the upper wall portion 14A. Further, the extension wall portion 14B is positioned outside the lower container 30'. In four corners of the upper container 10', the extension wall portion 14B extends downward and constitutes leg portion 14C. Further, as shown in FIGS. 17 and 18, the extension wall portion 14B has a notch portion 14D that is notched in an upward arc-shaped manner between a leg portion 14C and another leg portion 14C.

As shown in FIG. 18, the lower container 30' is a container having an open upper part and includes a bottom portion 31', a side wall portion 32', and handle portions 37.

The bottom portion 31' is a portion for receiving urine that has passed through the plurality of holes 12*a'* of the liquid passage portion 100' of the upper container 10', and the absorbent body 20*a* is arranged on the bottom portion 31'. That is, the bottom portion 31' of this example corresponds to the absorbent-body placement portion.

The side wall portion 32' is a wall-shaped portion that rises up from the peripheral edge of the bottom portion 31'.

The handle portions 37 are arranged on the outer surface of the side wall portion 32'. The handle portions 37 are provided one by one (two in total) on the lateral side of the lower container 30'. The handle portions 37 are provided so as to protrude outside the lower container 30'.

It should be noted that, although not shown in the drawing, the granules S are placed on the urine passage portion 100' of the upper container 10' in the same manner as in the above-described embodiments. In this animal litter box 1', the urine passage portion 100' (the hole 12*a'* or the like) is formed in the same manner as in the above-described embodiments, and this can make the granules S less likely to be caught.

Although the disclosure has been described with respect to only a limited number of embodiments, those skilled in the art, having benefit of this disclosure, will appreciate that various other embodiments may be devised without departing from the scope of the present invention.

Accordingly, the scope of the invention should be limited only by the attached claims.

REFERENCE SIGNS LIST 1, 1': animal litter box,
10, 10': upper container, 12, 12': bottom portion,
12a, 12a': hole (opening),
13, 13': outer peripheral portion, 14, 14': side portion,
14A: upper part wall portion, 14B: extension wall portion,
14C: leg portion,
14D: notch portion, 15: folded-back portion,
20: tray, 20a: absorbent body, 21: bottom portion, 22: side portion,
23: absorbent-body placement portion, 24: handle portion,
30, 30': lower container, 31: bottom portion, 31': bottom portion (absorbent-body placement portion)
31a: bottom opening,
32, 32': side wall portion, 33: front wall portion,
33b: recessed portion, 34: back wall portion,
35: folded-back portion,
36: accommodation space, 37: handle portion,
40: cover, 41: cover opening, 42: side wall portion,
43: front wall portion, 44: back wall portion, 45: overhanging portion,
50: test duckboard, 52: cylindrical member,
60: sieve shaker, 70: receiving container,
80: weight scale,
100: urine passage portion (liquid passage portion),
110: cross rib (second rib),
110a: front cross rib, 110b: back cross rib,
112: curved portion, 112a: lower inclined surface,
113a, 113b: front curved surface,
114a, 114b: back curved surface,
120: longitudinal rib (first rib),
120a: left longitudinal rib, 120b: right longitudinal rib,
120H: uppermost part, 120L: lowermost part,
121, upper curved surface (curved surface), 122: lower curved surface,
240: hooking hole,
351: protrusion, 352: fitting piece, 352a: protruding portion,
S: granule,
W: opening width (maximum width),
D: dimension, Da: maximum dimension

What is claimed is:

1. An animal litter box comprising:
a liquid passage portion configured to receive granules and having openings configured to allow urine to pass therethrough and allow one or more of the granules to be partially disposed therein without passing therethrough; and
an absorbent-body placement portion in which an absorbent body for absorbing the urine that has passed through the liquid passage portion is disposed, wherein each of the openings extends in a longitudinal direction, wherein a width of each of the openings in a plan view:
is equal to or smaller than 2.5 mm,
is located at a center of each of the openings in the longitudinal direction, and
extends in a width direction orthogonal to the longitudinal direction,
the liquid passage portion has first ribs extending in the longitudinal direction and disposed side-by-side in the width direction,
each of the openings is between two of the first ribs that are adjacent to each other in the width direction,
the width of each of the openings in the plan view is larger than a maximum dimension of each of the first ribs in the width direction,
the first ribs include:
a first vertical rib having:
a first uppermost part in a vertical direction orthogonal to the longitudinal direction and the width direction;
a first lowermost part in the vertical direction; and
a first side point between the first uppermost part and the first lowermost part in the vertical direction, wherein the first vertical rib has the maximum dimension at the first side point in the vertical direction; and
a second vertical rib having:
a second uppermost part in the vertical direction;
a second lowermost part in the vertical direction; and
a second side point between the second uppermost part and the second lowermost part in the vertical direction, wherein the second vertical rib has the maximum dimension at the second side point in the vertical direction,
in a cross-section view, the first vertical rib has a semicircular shape between the first uppermost part and the first side point,
in a cross-section view, the second vertical rib has the semicircular shape between the second uppermost part and the second side point,
in the cross-section view, a width of the first vertical rib decreases along the vertical direction between the first side point and the first lowermost part,
in the cross-section view, a width of the second vertical rib decreases along the vertical direction between the second side point and the second lowermost part, and
in the vertical direction, a first length of the first vertical rib between the first lowermost part and a vertical position of the first side point is longer than a second length of the second vertical rib between the second lowermost point and a vertical position of the second side point
wherein the first vertical rib is rounded at the first lowermost part and the second vertical rib is rounded at the second lowermost part.

2. The animal litter box according to claim 1, wherein the width of each of the openings in the plan view is equal to or smaller than 2.3 mm.

3. The animal litter box according to claim 1, wherein a liquid permeability of the liquid passage portion on which the granules are disposed is equal to or greater than 90%.

4. The animal litter box according to claim 1, wherein the width of each of the openings in the plan view is equal to or larger than 1.7 mm.

5. The animal litter box according to claim 1, wherein the maximum dimension of each of the first ribs in the width direction is equal to or smaller than 2.2 mm.

6. The animal litter box according to claim 1, wherein the semicircular shape has a radius equal to or smaller than 1.1 mm.

7. The animal litter box according to claim 1, wherein a widthwise central space between the two of the first ribs is equal to or smaller than 4.7 mm.

8. The animal litter box according to claim 1, wherein
the liquid passage portion has second ribs extending in the width direction and arranged side-by-side in the longitudinal direction,
each of the openings is surrounded by two of the first ribs and two of the second ribs, and
at least one of a lower end of the first ribs and a lower end of the second ribs has a curved portion that is curved upward.

9. The animal litter box according to claim 1, wherein
in the vertical direction, the first lowermost part of the first vertical rib is aligned with the second lowermost part of the second vertical rib.

\* \* \* \* \*